(12) United States Patent
Lee et al.

(10) Patent No.: US 10,908,840 B2
(45) Date of Patent: Feb. 2, 2021

(54) SEMICONDUCTOR MEMORY MODULE INCLUDING NONVOLATILE MEMORY DEVICES

(71) Applicant: Samsung Electronics Co., Ltd., Suwon-si (KR)

(72) Inventors: Taesung Lee, Hwaseong-si (KR); Junghwan Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 16/390,077

(22) Filed: Apr. 22, 2019

(65) Prior Publication Data
US 2020/0042232 A1    Feb. 6, 2020

(30) Foreign Application Priority Data

Aug. 3, 2018 (KR) .................. 10-2018-0090797

(51) Int. Cl.
| | |
|---|---|
| *G06F 3/06* | (2006.01) |
| *G06F 12/02* | (2006.01) |
| *G06F 12/0866* | (2016.01) |

(52) U.S. Cl.
CPC .......... *G06F 3/0656* (2013.01); *G06F 3/0659* (2013.01); *G06F 3/0688* (2013.01); *G06F 12/0238* (2013.01); *G06F 12/0246* (2013.01); *G06F 12/0866* (2013.01)

(58) Field of Classification Search
None
See application file for complete search history.

(56) References Cited

U.S. PATENT DOCUMENTS

| | | | |
|---|---|---|---|
| 9,396,109 B2 | 7/2016 | Chun et al. | |
| 9,852,060 B2 | 12/2017 | Berke et al. | |
| 9,916,873 B2 | 3/2018 | Giovannini et al. | |
| 2013/0086311 A1 | 4/2013 | Huang et al. | |
| 2015/0363107 A1* | 12/2015 | Best | G11C 7/1093 |
| | | | 711/105 |
| 2016/0357454 A1* | 12/2016 | Lee | G06F 13/385 |
| 2016/0364153 A1* | 12/2016 | Nam | G11C 16/00 |
| 2017/0024162 A1 | 1/2017 | Lim et al. | |
| 2017/0192888 A1* | 7/2017 | Moon | G06F 13/4068 |
| 2017/0293427 A1* | 10/2017 | Kwon | G06F 12/0638 |
| 2017/0357604 A1* | 12/2017 | Lim | G06F 3/0685 |
| 2018/0059933 A1 | 3/2018 | Helmick et al. | |
| 2018/0059976 A1* | 3/2018 | Helmick | G06F 12/0246 |
| 2018/0089087 A1 | 3/2018 | Chang et al. | |
| 2018/0181504 A1* | 6/2018 | Morris | G11C 11/4076 |
| 2018/0335979 A1* | 11/2018 | Kim | G06F 11/1068 |
| 2019/0087292 A1* | 3/2019 | Kim | G11C 29/883 |
| 2019/0340142 A1* | 11/2019 | Patel | G06F 3/0673 |

* cited by examiner

*Primary Examiner* — Kaushikkumar M Patel
(74) *Attorney, Agent, or Firm* — Muir Patent Law, PLLC

(57) ABSTRACT

A semiconductor memory module includes data buffers that exchange first data signals with an external device, nonvolatile memory devices that are respectively connected to the data buffers through data lines, and a controller connected to the data lines. The controller receives an address, a command, and a control signal from the external device, and depending on the address, the command, and the control signal, the controller controls the data buffers through first control lines and controls the nonvolatile memory devices through second control lines.

20 Claims, 19 Drawing Sheets

SEMICONDUCTOR MEMORY MODULE INCLUDING NONVOLATILE MEMORY DEVICES

CROSS-REFERENCE TO RELATED APPLICATIONS

This application claims priority under 35 U.S.C. § 119 to Korean Patent Application No. 10-2018-0090797 filed on Aug. 3, 2018, in the Korean Intellectual Property Office, the disclosure of which is incorporated by reference herein in its entirety.

BACKGROUND

Embodiments of the inventive concept disclosed herein relate to a semiconductor device, and more particularly, relate to a semiconductor memory module including nonvolatile memory devices.

A computing system includes a processor, a main memory, and an auxiliary memory. The auxiliary memory may store data of an operating system installed on the computing system, data of an application, or data generated by the operating system or the application. The auxiliary memory includes a hard disk drive, a solid state drive, etc., and is accessed by the processor through a particular bus, for example, a peripheral component interconnect express (PCIe) bus.

The main memory is used to temporarily store data, which the processor uses, from among the data stored in the auxiliary memory. In general, the main memory includes a memory, which supports a high-speed random access, such as a synchronous dynamic random access memory (SDRAM). The main memory is manufactured to operate in compliance with standards such as a dual in-line memory module (DIMM), a registered DIMM (RDIMM), and a load reduced DIMM (LRDIMM).

The main memory manufactured in compliance with the standard is implemented in such a way that semiconductor memory packages are attached on a printed circuit board. The main memory manufactured in compliance with the standard is implemented to be attached to the computing system or to be easily removable from the computing system. For this reason, the main memory is called a "semiconductor memory module".

Nowadays, there is development on a main memory which has a large storage capacity with relatively low costs compared to the SDRAM and an operating speed approximate to an operating speed of the SDRAM and stores data in a nonvolatile manner. The main memory includes a nonvolatile memory device such as a phase change RAM (PRAM), a resistive RAM (RRAM), a magnetic RAM (MRAM), a ferroelectric RAM (FRAM), or a flash memory, and is called a "storage class memory" (SCM).

An existing computing system has been manufactured to use a main memory manufactured in compliance with the standards such as DIMM, RDIMM, and LRDIMM. Accordingly, the storage class memory is being developed to coincide with the standards, such as DIMM, RDIMM, and LRDIMM, for the purpose of applying the storage class memory to an existing computing system without additional costs.

However, the standards for the existing main memory are decided in consideration of an operating characteristic of the SDRAM, and do not coincide with an operating characteristic of a nonvolatile memory device. Accordingly, there is a demand on a semiconductor memory module coinciding with the standard of the main memory while including the nonvolatile memory device.

SUMMARY

Embodiments of the inventive concept provide a semiconductor memory module having reduced costs and reduced noise while coinciding with standards of a main memory.

According to an exemplary embodiment, a semiconductor memory module includes data buffers that exchange first data signals with an external device outside of the semiconductor memory module, nonvolatile memory devices that are respectively connected to the data buffers through data lines, and an internal memory module controller connected to the data lines. The controller receives an address, a command, and a control signal from the external device, and depending on the address, the command, and the control signal, the controller controls the data buffers through first control lines and controls the nonvolatile memory devices through second control lines.

According to an exemplary embodiment, which may include the above-described embodiment, a semiconductor memory module includes data buffers that exchange data signals with an external device outside of the semiconductor memory module, first nonvolatile memory devices that are respectively connected to the data buffers through data lines, second nonvolatile memory devices that are respectively connected to the data buffers through the data lines, and a controller connected to the data lines. The controller receives an address, a command, and a control signal from the external device, and, depending on the address, the command, and the control signal, the first nonvolatile memory devices communicate with the data buffers through the data lines and the controller and the second nonvolatile memory devices directly communicate with the data buffers through the data lines.

According to an exemplary embodiment, which may include the above-described embodiments, a semiconductor memory module includes data buffers that exchanges data signals with an external device outside of the semiconductor memory module, nonvolatile memory devices that are respectively connected with the data buffers through data lines, and a controller connected to the data lines. The data lines include first lines extending from one side of the controller, second lines extending from the first lines toward the data buffers, and third lines extending from the first lines toward the nonvolatile memory devices. The controller receives an address, a command, and a control signal from the external device, and depending on the address, the command, and the control signal, the controller controls the data buffers through first control lines and controls the nonvolatile memory devices through second control lines.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Figure 1:
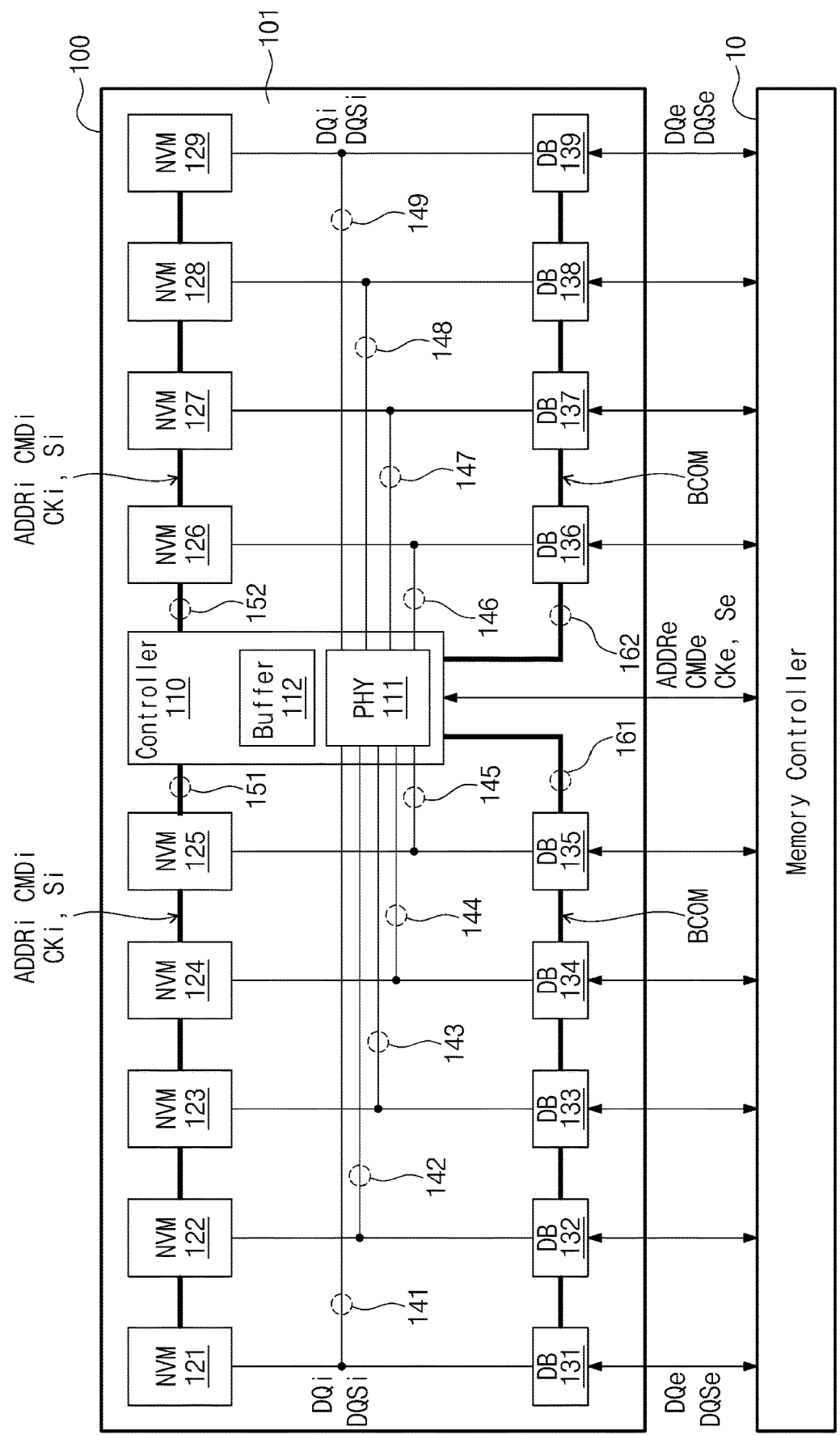
FIG. 1 is a block diagram illustrating a semiconductor memory module according to a first embodiment of the inventive concept.

FIG. 1 is a block diagram illustrating a semiconductor memory module 100 according to a first embodiment of the inventive concept. Referring to FIG. 1, the semiconductor memory module 100 includes a controller 110, nonvolatile memory devices 121 to 129, and data buffers 131 to 139. The controller 110, the nonvolatile memory devices 121 to 129, and the data buffers 131 to 139 may be implemented with different semiconductor packages, and the semiconductor packages may be mounted on a printed circuit board 101 to form the memory module 100. Each semiconductor package may include one or more semiconductor chips mounted on a package substrate, and covered with a molding layer.

The controller 110 may receive an external address ADDRe, an external command CMDe, an external clock signal CKe, and an external selection signal Se from an external memory controller 10. The external address ADDRe may be received in the form of a set of address signals, and the external command CMDe may be received in the form of a set of command signals. Signals that the controller 110 receives from the memory controller 10 are not limited to the above-described signals. The controller 110 may receive various signals (e.g., control signals) from the memory controller 10. The memory controller 10 may be outside of the memory module 100, for example, as part of a host device, and not mounted on the printed circuit board 101. The controller 110 may be included as part of the memory module 100, and therefore may be referred to herein as an internal memory module controller internal to the memory module 100 (as opposed to an external memory controller, such as memory controller 10).

The controller 110 may be connected to first to ninth nonvolatile memory devices 121 to 129 and the first to ninth data buffers 131 to 139 through first to ninth data lines 141 to 149. For example, each of the first to ninth data lines 141 to 149 may include two or more lines (e.g., 8) transferring internal data signals DQi and at least one line (e.g., 2) transferring internal data strobe signals DQSi. Thus, in some cases, each data line of the first to ninth data lines 141 to 149 may be referred to as a data line set.

The controller 110 may receive the internal data signals DQi and the internal data strobe signals DQSi with the first to ninth nonvolatile memory devices 121 to 129 or the first to ninth data buffers 131 to 139 through the first to ninth data lines 141 to 149. The controller 110 may latch levels of the internal data signals DQi in synchronization with transition timings of the internal data strobe signals DQSi.

The controller 110 may transmit the internal data signals DQi and the internal data strobe signals DQSi to the first to ninth nonvolatile memory devices 121 to 129 or the first to ninth data buffers 131 to 139 through the first to ninth data lines 141 to 149. The controller 110 may generate the internal data strobe signals DQSi from the external clock signal CKe, and may adjust a level of the internal data signals DQi in synchronization with the transition timings of the internal data strobe signals DQSi.

The controller 110 may transmit an internal address ADDRi, an internal command CMDi, an internal clock signal CKi, and an internal selection signal Si in common to the first to ninth nonvolatile memory devices 121 to 129 through first control lines 151 and 152 in response to the external address ADDRe, the external command CMDe, the external clock signal CKe, and the external selection signal Se. The internal address ADDRi may be transmitted in the form of a set of address signals, and the internal command CMDi may be transmitted in the form of a set of command signals. It should be noted that although the terms first, second, third etc. may be used herein to describe various elements, components, regions, and/or sections, these elements, components, regions, and/or sections should not be limited by these terms. Unless the context indicates otherwise, these terms are only used to distinguish one element, component, region, or section from another element, component, region, or section, for example as a naming convention. Thus, a first element, component, region, or section discussed below in one section of the specification could be termed a second element, component, region, or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

Signals which the controller 110 transmits to the first to ninth nonvolatile memory devices 121 to 129 are not limited to the above-described signals. The controller 110 may transmit various signals (e.g., control signals) including the internal selection signal Si to the first to ninth nonvolatile memory devices 121 to 129. Signals which the controller 110 transmits to the first to ninth nonvolatile memory devices 121 to 129 may be identical or similar to signals which the controller 110 receives from the memory controller 10.

The controller 110 may allow the first to ninth nonvolatile memory devices 121 to 129 to receive and write the internal data signals DQi transferred through the first to ninth data lines 141 to 149 by using the internal command CMDi and the internal selection signal Si. The controller 110 may specify a location of a storage space, in which each of the first to ninth nonvolatile memory devices 121 to 129 stores the internal data signals DQi, by using the internal address ADDRi.

Also, by using the internal command CMDi and the internal selection signal Si, the controller 110 may allow the first to ninth nonvolatile memory devices 121 to 129 to read stored data and to transmit the read data as the internal data signals DQi through the first to ninth data lines 141 to 149. The controller 110 may specify a location of a storage space, in which each of the first to ninth nonvolatile memory devices 121 to 129 will read data, by using the internal address ADDRi.

The controller 110 may control the first to ninth data buffers 131 to 139 in response to the external command CMDe and the external selection signal Se. The controller 110 may transmit a buffer command BCOM in common to the first to ninth data buffers 131 to 139 through second control lines 161 and 162. The buffer command BCOM may be implemented by a combination of buffer command signals.

The first to ninth nonvolatile memory devices 121 to 129 may receive and write the internal data signals DQi from the first to ninth data lines 141 to 149 in response to the internal command CMDi, the internal address ADDRi, and the internal selection signal Si. Each of the first to ninth nonvolatile memory devices 121 to 129 may latch levels of the internal data signals DQi in synchronization with the transition timings of the internal data strobe signals DQSi.

The first to ninth nonvolatile memory devices 121 to 129 may read data written therein in response to the internal command CMDi, the internal address ADDRi, and the internal selection signal Si and may transmit the read data as the internal data signals DQi to the first to ninth data lines 141 to 149.

Each of the first to ninth nonvolatile memory devices 121 to 129 may generate the internal data strobe signals DQSi from the internal clock signal CKi, and may adjust levels of the internal data signals DQi in synchronization with the transition timings of the internal data strobe signals DQSi.

The first to ninth data buffers 131 to 139 may operate in response to the buffer command BCOM. When the buffer command BCOM indicates a read operation, the first to ninth data buffers 131 to 139 may transfer the internal data signals DQi and the internal data strobe signals DQSi transferred through the first to ninth data lines 141 to 149 to the memory controller 10 as the external data signals DQe and the external data strobe signals DQSe.

When the buffer command BCOM indicates a write operation, the first to ninth data buffers 131 to 139 may transmit the external data signals DQe and the external data strobe signals DQSe transferred from the memory controller 10 to the first to ninth data lines 141 to 149 as the internal data signals DQi and the internal data strobe signals DQSi.

As illustrated in FIG. 1, the controller 110, the first to ninth nonvolatile memory devices 121 to 129, and the first to ninth data buffers 131 to 139 may be connected in common to the first to ninth data lines 141 to 149.

In this case, the number of wirings necessary for the semiconductor memory module 100 and complexity of wiring placement may decrease compared to the case where the connection between the first to ninth nonvolatile memory devices 121 to 129 and the controller 110 and the connection between the first to ninth data buffers 131 to 139 and the controller 110 are made by using different data lines. Accordingly, manufacturing costs of the semiconductor memory module 100 are reduced.

Also, compared to the case where the connection between the first to ninth nonvolatile memory devices 121 to 129 and the controller 110 and the connection between the first to ninth data buffers 131 to 139 and the controller 110 are made by using different data lines, a distance between wirings increases, and thus, interference between wirings decreases. Accordingly, noise occurring due to the interference at the semiconductor memory module 100 decreases.

The controller 110 may include a physical block 111 which supports communicating in common (e.g., through the same set of switches, drivers, and other circuitry of the physical block 111) with the first to ninth nonvolatile memory devices 121 to 129 and the first to ninth data buffers 131 to 139 through the first to ninth data lines 141 to 149. The physical block 111 may exchange the internal data signals DQi and the internal data strobe signals DQSi with the first to ninth data lines 141 to 149.

The physical block 111 may transmit or receive the internal data signals DQi and the internal data strobe signals DQSi in the same manner upon communicating with the first to ninth nonvolatile memory devices 121 to 129 and upon communicating with the first to ninth data buffers 131 to 139.

The physical block 111 may receive the external address ADDRe, the external command CMDe, the external clock signal CKe, and the external selection signal Se from the memory controller 10. The physical block 111 may generate the internal address ADDRi, the internal command CMDi, the internal clock signal CKi, and the internal selection signal Si from the external address ADDRe, the external command CMDe, the external clock signal CKe, and the external selection signal Se.

When all storage spaces of the first to ninth nonvolatile memory devices 121 to 129 are configured to be accessed by the memory controller 10, the physical block 111 may directly output the external address ADDRe as the internal address ADDRi through the first control lines 151 and 152.

When some of the storage spaces of the first to ninth nonvolatile memory devices 121 to 129 are accessed by the memory controller 10 and the remaining storage spaces are used as a meta area of the semiconductor memory module 100, the physical block 111 may convert the external address ADDRe to the internal address ADDRi and may output the internal address ADDRi through the first control lines 151 and 152.

The physical block 111 may directly transmit the external command CMDe transmitted from the memory controller 10 through the first control lines 151 and 152 as the internal command CMDi. The physical block 111 may directly transmit the external clock signal CKe through the first control lines 151 and 152 as the internal clock signal CKi.

The physical block 111 may directly transmit the external selection signal Se through the first control lines 151 and 152 as the internal selection signal Si or may convert the external selection signal Se to the internal selection signal Si and may transmit the internal selection signal Si through the first control lines 151 and 152. The physical block 111 may transmit the buffer command BCOM to the first to ninth data buffers 131 to 139 through the second control lines 161 and 162. The physical block 111 may comprise an interface of the controller 110 (e.g., an interface circuit), and may include, for example, various switches and drivers for routing communications between memory controller 10, controller 110, nonvolatile memory devices 121 to 129, and data buffers 131-139.

Since the controller 110, the first to ninth nonvolatile memory devices 121 to 129, and the first to ninth data buffers 131 to 139 use the first to ninth data lines 141 to 149 in common, arbitration is used with regard to whether any entities of a first entity (e.g., the controller 110), a second entity (e.g., the first to ninth nonvolatile memory devices 121 to 129), and a third entity (e.g., the first to ninth data buffers 131 to 139) perform communication.

For example, collision may occur if the third entity performs communication while the first entity and the second entity perform communication. The controller 110 may perform arbitration for the purpose of preventing the collision from occurring. As the arbitration is performed, a timing when the physical block 111 receives the external address ADDRe, the external command CMDe, the external clock signal CKe, and the external selection signal Se from the memory controller 110 may be different from a timing when the physical block 111 transmits the internal address ADDRi, the internal command CMDi, the internal clock signal CKi, and the internal selection signal Si to the first to ninth nonvolatile memory devices 121 to 129.

In the case where the controller 110 uses different wirings upon communicating with the first to ninth nonvolatile memory devices 121 to 129 and upon communicating with the first to ninth data buffers 131 to 139, different physical blocks corresponding to the different wirings may be required. As illustrated in FIG. 1, in the case where one physical block 111 is provided in the controller 110, the complexity and manufacturing costs of the controller 110 are reduced. Accordingly, the complexity and manufacturing costs of the semiconductor memory module 100 are reduced.

The controller 110 may further include a buffer 112. The controller 110 may store the internal data signals DQi transmitted from the first to ninth nonvolatile memory devices 121 to 129 in the buffer 112. The controller 110 may read data stored in the buffer 112 and may transmit the read data to the first to ninth data buffers 131 to 139 as the internal data signals DQi.

Likewise, the controller 110 may store the internal data signals DQi transmitted from the first to ninth data buffers 131 to 139 in the buffer 112. The controller 110 may read data stored in the buffer 112 and may transmit the read data to the first to ninth nonvolatile memory devices 121 to 129 as the internal data signals DQi.

The controller 110 may store information about the external address ADDRe, the external command CMDe, and the external selection signal Se received from the memory controller 10 in the buffer 112. The controller 110 may generate the internal address ADDRi, the internal command CMDi, and the internal selection signal Si based on the information stored in the buffer 112.

Figure 2:
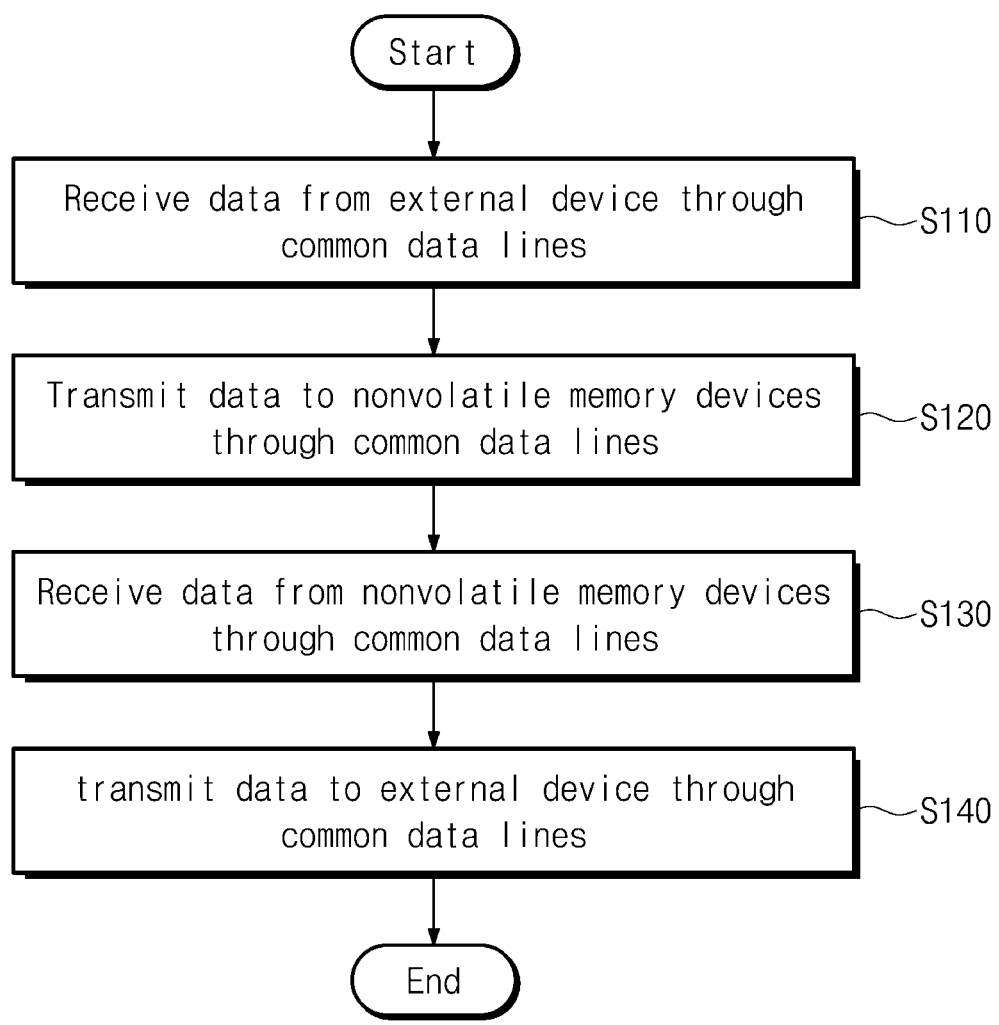
FIG. 2 is a flowchart illustrating an operation method of a semiconductor memory module according to some embodiments of the inventive concept.

FIG. 2 is a flowchart illustrating an operation method of the semiconductor memory module 100 according to an embodiment of the inventive concept. Referring to FIGS. 1 and 2, in operation S110, the controller 110 may receive the internal data signals DQi from an external device, for example, the memory controller 10, through the first to ninth data buffers 131 to 139 and the common first to ninth data lines (hereinafter referred to as "common data lines") 141 to 149.

In operation S120, the controller 110 may transmit the internal data signals DQi to the first to ninth nonvolatile memory devices 121 to 129 through the common data lines 141 to 149.

In operation S130, the controller 110 may receive the internal data signals DQi from the first to ninth nonvolatile memory devices 121 to 129 through the common data lines 141 to 149.

In operation S140, the controller 110 may transmit the internal data signals DQi to the external device, for example, the memory controller 10, through the common data lines 141 to 149 and the first to ninth data buffers 131 to 139.

Figure 3:
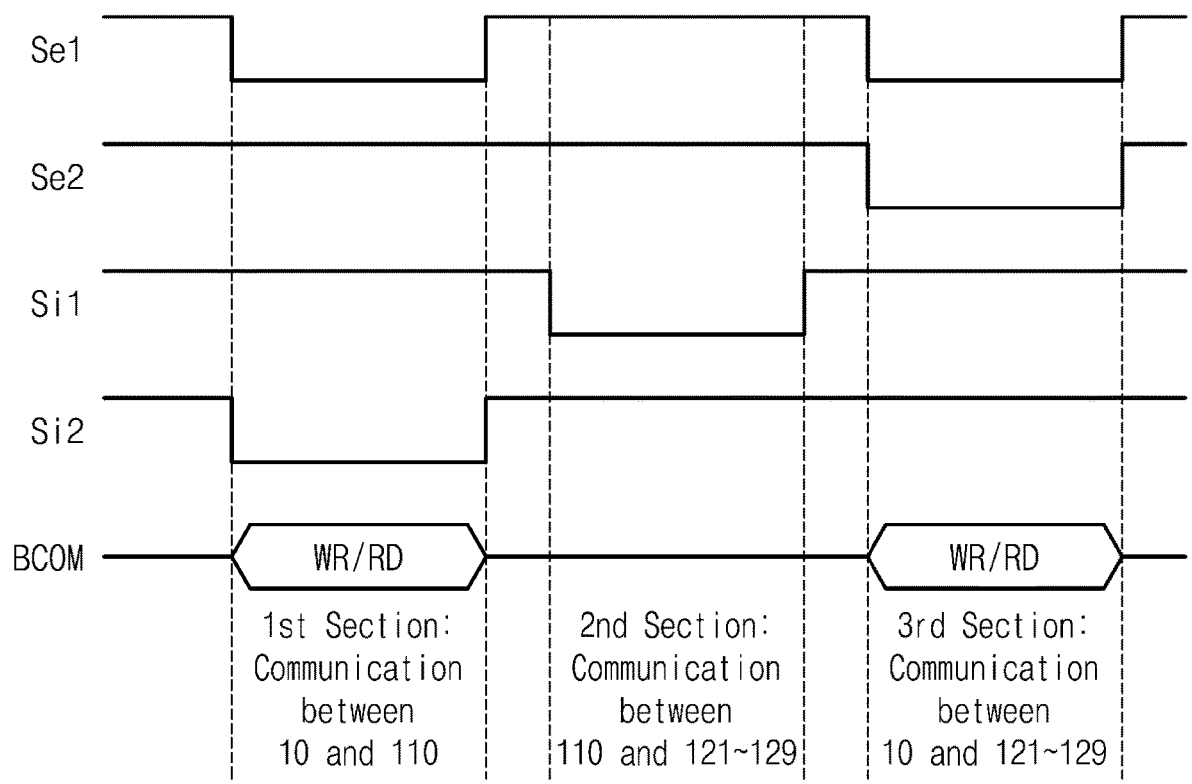
FIG. 3 is a diagram illustrating an example in which an external selection signal and an internal selection signal are adjusted.

FIG. 3 is a diagram illustrating an example in which the external selection signal Se and the internal selection signal Si are adjusted. Referring to FIGS. 1 and 3, the external selection signal Se may include a first external selection signal Se1 and a second external selection signal Se2. The first external selection signal Se1 may be activated (e.g., to a low level) by the memory controller 10 in order to cause or set the memory controller 10 to access the first to ninth nonvolatile memory devices 121 to 129 through the controller 110.

The second external selection signal Se2 may be activated (e.g., to a low level) by the memory controller 10 in order to cause or set the memory controller 10 to access the first to ninth nonvolatile memory devices 121 to 129 without passing through the controller 110 (e.g., by bypassing the controller 110).

The internal selection signal Si may include a first internal selection signal Si1 and a second internal selection signal Si2. The first internal selection signal Si1 may be activated (e.g., to a low level) by the controller 110 in order to cause or set the controller 110 to access the first to ninth nonvolatile memory devices 121 to 129.

The second internal selection signal Si2 may be activated (e.g., to a low level) by the controller 110 in order to cause or set the controller 110 to limit communication with the first to ninth nonvolatile memory devices 121 to 129. In one embodiment, the second internal selection signal Si2 may be omitted. The communication with the first to ninth nonvolatile memory devices 121 to 129 may be limited by deactivating the first internal selection signal Si1 (e.g., to a high level), instead of the second internal selection signal Si2.

In a first section, or first period of time, the memory controller 10 and the controller 110 may communicate with each other through the first to ninth data buffers 131 to 139 and the first to ninth data lines 141 to 149. For example, the communication between the memory controller 10 and the controller 110 may be established to allow the memory controller 10 to write or read data to or from the first to ninth nonvolatile memory devices 121 to 129 through the controller 110.

In an example of a write operation, the memory controller 10 may transmit the external address ADDRe and the external command CMDe directing the write operation to the controller 110. Also, the memory controller 10 may activate the first external selection signal Se1 for the purpose of providing notification that the first to ninth nonvolatile memory devices 121 to 129 are targeted for the write operation. The memory controller 10 may deactivate the second external selection signal Se2 for the purpose of providing notification that the write operation is performed through the controller 110.

As the external command CMDe directs the write operation, the controller 110 may transmit a write command WR to the first to ninth data buffers 131 to 139 as the buffer command BCOM. The controller 110 may receive write data from the memory controller 10 through the first to ninth data buffers 131 to 139 and the first to ninth data lines 141 to 149 in the form of the internal data signals DQi.

To prevent collisions from occurring at the first to ninth data lines 141 to 149 by the first to ninth nonvolatile memory devices 121 to 129, the controller 110 may deactivate the first internal selection signal Si1 and may activate the second internal selection signal Si2. In an example of a read operation, the memory controller 10 may transmit the external address ADDRe and the external command CMDe directing the read operation to the controller 110. The memory controller 10 may activate the first external selection signal Se1 and may deactivate the second external selection signal Se2.

As the external command CMDe directs the read operation, the controller 110 may transmit a read command RD to the first to ninth data buffers 131 to 139 as the buffer command BCOM. In one embodiment, data which the memory controller 10 requests may be already stored in the buffer 112 of the controller 110.

The controller 110 may transmit the requested data to the memory controller 10 through the first to ninth data lines 141 to 149 and the first to ninth data buffers 131 to 139 in the form of the internal data signals DQi. To prevent collision, the controller 110 may deactivate the first internal selection signal Si1 and may activate the second internal selection signal Si2.

In the first section, the first to ninth data buffers 131 to 139 may exchange the internal data signals DQi with the controller 110 through the first to ninth data lines 141 to 149. The first to ninth nonvolatile memory devices 121 to 129 may ignore the internal data signals DQi transmitted through the first to ninth data lines 141 to 149 (e.g., based on the first internal selection signal Si1 and the second internal selection signal Si2 which are responsive to the first external selection signal Se1 and the second external selection signal Se2) and may not transmit any signals to the first to ninth data lines 141 to 149.

In a second section, or second time period, the controller 110 and the first to ninth nonvolatile memory devices 121 to 129 may communicate with each other through the first to ninth data lines 141 to 149.

For example, the communication may be performed between the controller 110 and the first to ninth nonvolatile memory devices 121 to 129 upon writing data stored in the buffer 112 to the first to ninth nonvolatile memory devices 121 to 129 by the memory controller 10 or upon reading data requested by the memory controller 10 from the first to ninth nonvolatile memory devices 121 to 129.

The second section is associated with the communication being performed within the semiconductor memory module 100, and is not associated with the memory controller 10. Accordingly, the first external selection signal Se1 and the second external selection signal Se2 may be in an inactive state (e.g., a high level). The controller 110 may transmit the internal address ADDRi and the internal command CMDi directing a read or write operation to the first to ninth nonvolatile memory devices 121 to 129.

To provide notification that the first to ninth nonvolatile memory devices 121 to 129 are targeted for communication, the controller 110 may activate the first internal selection signal Si1 (to a low level) and may deactivate the second internal selection signal Si2 (to a high level). Since the first to ninth data buffers 131 to 139 are not associated with the second section, the controller 110 may not transmit the buffer command BCOM.

The controller 110 may transmit or receive the data to or from the first to ninth nonvolatile memory devices 121 to 129 through the first to ninth data lines 141 to 149 in the form of internal data signals DQi.

In the second section, the first to ninth nonvolatile memory devices 121 to 129 may exchange the internal data signals DQi with the controller 110 through the first to ninth data lines 141 to 149. The first to ninth data buffers 131 to 139 may ignore the internal data signals DQi transmitted through the first to ninth data lines 141 to 149 (e.g., based on the buffer command BCOM, which is responsive to the first external selection signal Se1 and the second external selection signal Se2) and may not transmit any signals to the first to ninth data lines 141 to 149.

In a third section, the memory controller 10 and the first to ninth nonvolatile memory devices 121 to 129 may communicate with each other through the first to ninth data buffers 131 to 139 and the first to ninth data lines 141 to 149.

For example, the communication may be performed between the memory controller 10 and the first to ninth nonvolatile memory devices 121 to 129 in order to cause or set the memory controller 10 to write data directly to the first to ninth nonvolatile memory devices 121 to 129 or to cause or set the memory controller 10 to read data directly from the first to ninth nonvolatile memory devices 121 to 129.

The memory controller 10 may transmit the external address ADDRe and the external command CMDe directing the write or read operation to the controller 110. The controller 110 may convert the external address ADDRe and the external command CMDe to transmit the internal address ADDRi and the internal command CMDi to the first to ninth nonvolatile memory devices 121 to 129 or may transmit the external address ADDRe and the external command CMDe to the first to ninth nonvolatile memory devices 121 to 129 as the internal address ADDRi and the internal command CMDi without conversion.

Also, the memory controller 10 may activate the first external selection signal Se1 (to a low level) for the purpose of providing notification that the first to ninth nonvolatile memory devices 121 to 129 are targeted for an access. The memory controller 10 may activate the second external selection signal Se2 (to a low level) for the purpose of providing notification that the access is performed without passing through the controller 110.

Depending on the external command CMDe, the controller 110 may transmit a write command WR or a read command RD to the first to ninth data buffers 131 to 139 as the buffer command BCOM. The first to ninth nonvolatile memory devices 121 to 129 may exchange data with the memory controller 10 through the first to ninth data lines 141 to 149 in the form of the internal data signals DQi.

To prevent collisions from occurring at the first to ninth data lines 141 to 149, the controller 110 may ignore the internal data signals DQi transferred through the first to ninth data lines 141 to 149 (e.g., based on the first external selection signal Se1 and the second external selection signal Se2) and may not transmit any signals to the first to ninth data lines 141 to 149.

In the third section, the first to ninth data buffers 131 to 139 may exchange the internal data signals DQi with the first to ninth nonvolatile memory devices 121 to 129 through the first to ninth data lines 141 to 149. The controller 110 may ignore the internal data signals DQi transmitted through the first to ninth data lines 141 to 149 and may not transmit any signals to the first to ninth data lines 141 to 149.

In some embodiments, the memory controller 10 may be prohibited from directly accessing the first to ninth nonvolatile memory devices 121 to 129 without passing through the controller 110. In this case, the second external selection signal Se2 may be omitted.

Figure 4:
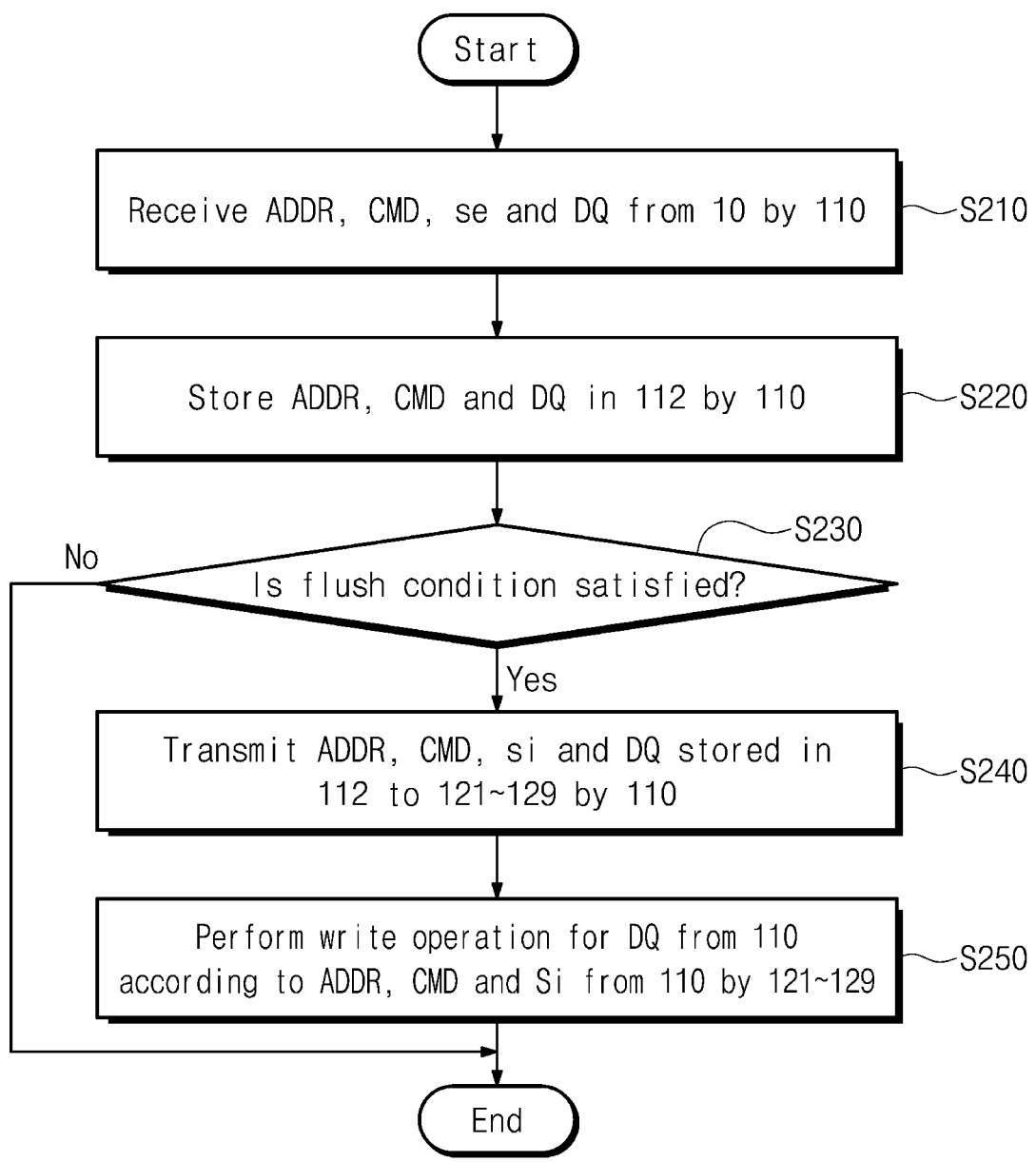
FIG. 4 is a flowchart illustrating an example in which data are written from a memory controller to first to ninth nonvolatile memory devices through a controller.

FIG. 4 is a flowchart illustrating an example in which data are written from the memory controller 10 to the first to ninth nonvolatile memory devices 121 to 129 through the controller 110. Referring to FIGS. 1 and 4, in operation S210, the controller 110 may receive an address ADDR, a command CMD, and data signals DQ from the memory controller 10.

For example, the controller 110 receives the external address ADDRe, the external command CMDe, and the external selection signal Se from the memory controller 10. The first to ninth data buffers 131 to 139 may transmit external data signals DQe received from the memory controller 10 to the controller 110 as the internal data signals DQi.

In operation S220, the controller 110 stores the external address ADDRe and the external command CMDe (e.g., a write command) received from the memory controller 10 and the internal data signals DQi received through the first to ninth data buffers 131 to 139 in the buffer 112. For example, the controller 110 may store the external address ADDRe and the external command CMDe or information about the external address ADDRe and the external command CMDe in the buffer 112.

The controller 110 may complete a first operation according to the external command CMDe (a write command in operation S210) of the memory controller 10 by storing the external address ADDRe, the external command CMDe, and the internal data signals DQi (operation S220). The controller 110 may perform a second operation (e.g., a flush operation) of storing the internal data signals DQi stored in the buffer 112 to the first to ninth nonvolatile memory devices 121 to 129 without intervention of the memory controller 10. For example, the controller 110 may support a write back operation.

In operation S230, the controller 110 determines whether a flush condition is satisfied. For example, the flush condition may be satisfied when a flush command is received from the memory controller 10 as the external command CMDe. For another example, the flush condition may be satisfied when an idle time when the memory controller 10 does not access the semiconductor memory module 100 is not less than a threshold.

When the flush condition is not satisfied, the flush operation is not performed, and the process is terminated. When the flush condition is satisfied, operation S240 is performed. In operation S240, the controller 110 transmits the internal address ADDRi, the internal command CMDi, and the internal data signals DQi stored in the buffer 112 and the internal selection signal Si to the first to ninth nonvolatile memory devices 121 to 129.

In operation S250, the first to ninth nonvolatile memory devices 121 to 129 perform a write operation depending on the internal address ADDRi, the internal command CMDi, and the internal data signals DQi, and the internal selection signal Si from the controller 110. Accordingly, data write-requested by the memory controller 10 may be finally written to the first to ninth nonvolatile memory devices 121 to 129.

As described above, the controller 110 may refer to a flush condition for the purpose of preventing the communication between the memory controller 10 and the controller 110 from colliding with the communication between the controller 110 and the first to ninth nonvolatile memory devices 121 to 129.

Figure 5:
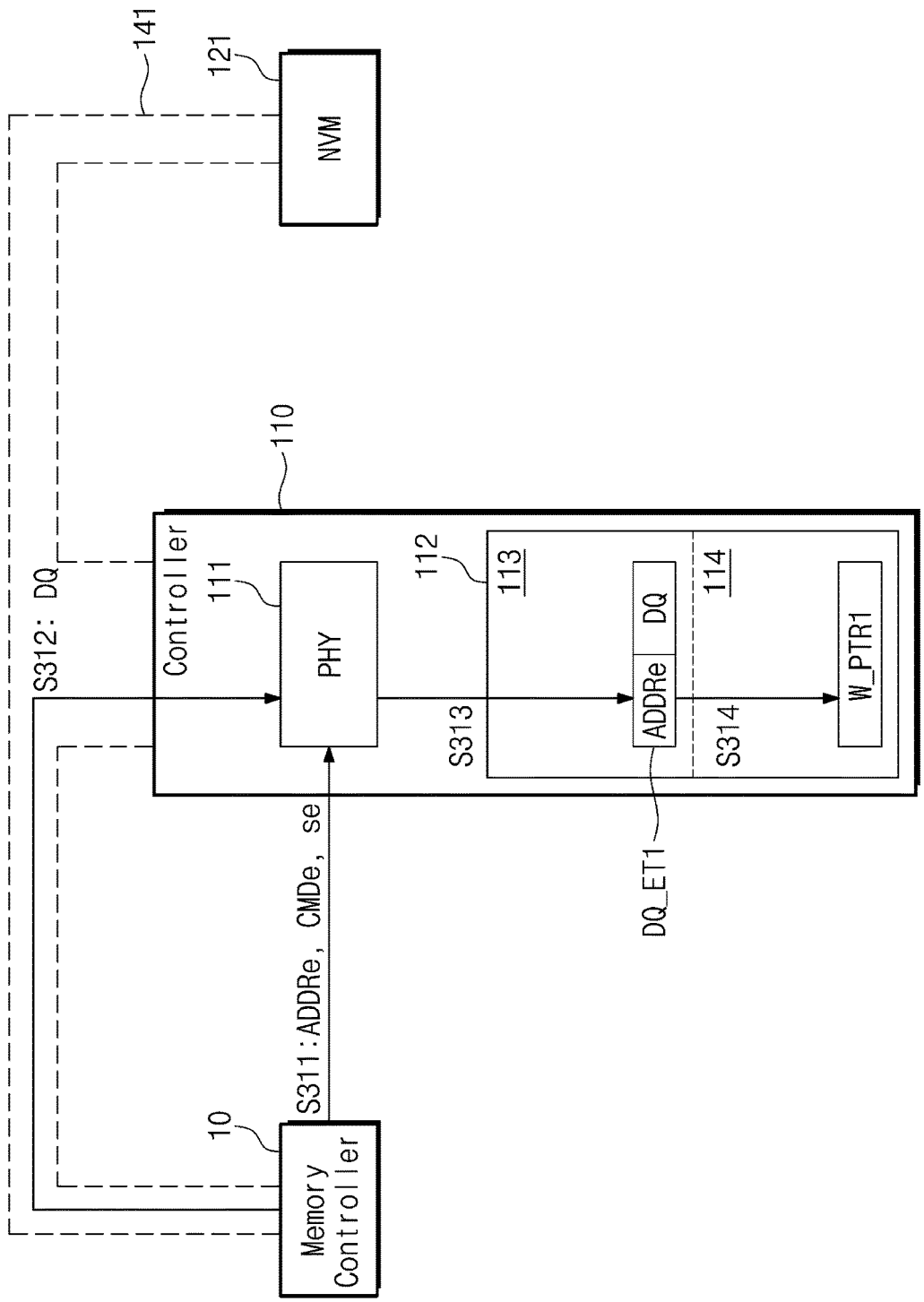
FIG. 5 is a diagram illustrating an example in which data signals are transferred from a memory controller to a controller.

FIG. 5 is a diagram illustrating an example in which the data signals DQ are transferred from the memory controller 10 to the controller 110. In an embodiment, the remaining components other than the memory controller 10, the controller 110, and the first nonvolatile memory device 121 are omitted. The second to ninth nonvolatile memory devices 122 to 129 may operate at the same time as the first nonvolatile memory device 121. The external data signals DQe and the internal data signals DQi may be referenced in common as data signals DQ.

Referring to FIG. 5, in operation S311, the memory controller 10 may transmit the external address ADDRe and the external command CMDe to the controller 110 and may control the external selection signal Se like the first section of FIG. 3. The external command CMDe may be a write command. In operation S312, the memory controller 10 may transmit the data signals DQ to the controller 110 through the first data line 141. The controller 110 may receive the external address ADDRe, the external command CMDe, the external selection signal Se, and the data signals DQ by using the physical block 111.

In operation S313, the controller 110 may store the external address ADDRe and the data signals DQ received from the memory controller 10 to a first area 113 of the buffer 112 as a first data entity DQ_ET1. In operation S314, the controller 110 may store a first write pointer W_PTR1 directing the first data entity DQ_ET1 to a second area 114 of the buffer 112.

The first write pointer W_PTR1 may include information indicating that a write operation is performed or information about a location of the first area 113, at which the first data entity DQ_ET1 is stored. For example, the first write pointer W_PTR1 may function as a dirty flag indicating that any data entity stored in the first area 113 may be written to the first to ninth nonvolatile memory devices 121 to 129.

Figure 6:
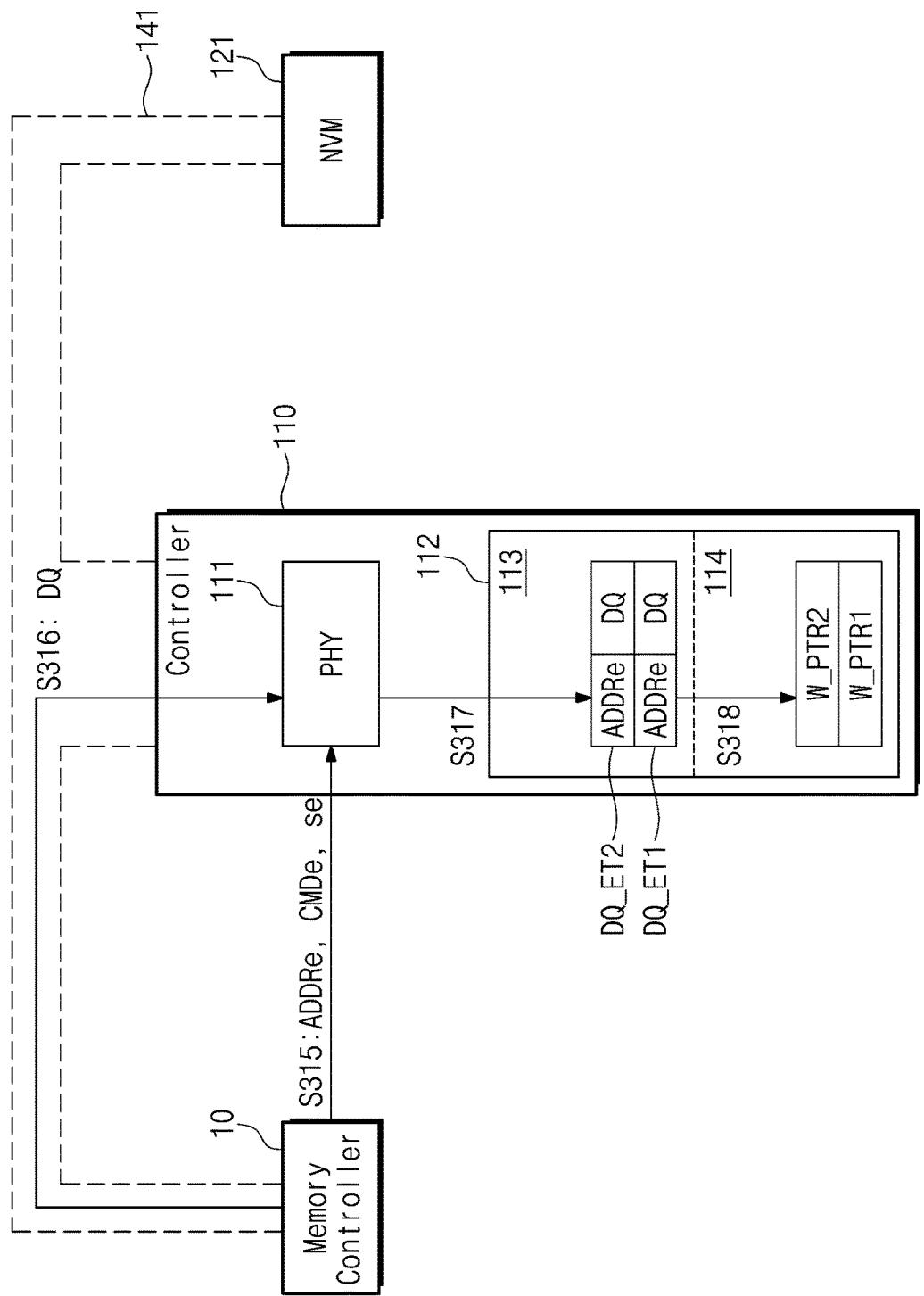
FIG. 6 is a diagram illustrating an example in which data signals are further transferred from a memory controller to a controller, following FIG. 5.

FIG. 6 is a diagram illustrating an example in which the data signals DQ are further transferred from the memory controller 10 to the controller 110, following FIG. 5. Referring to FIG. 6, in operation S315, the memory controller 10 may transmit the external address ADDRe and the external command CMDe (e.g., a write command) to the controller 110 and may control the external selection signal Se like the first section of FIG. 3.

In operation S316, the memory controller 10 may transmit the data signals DQ to the controller 110 through the first data line 141. In operation S317, the controller 110 may store the external address ADDRe and the data signals DQ received from the memory controller 10 to the first area 113 as a second data entity DQ_ET2. In operation S318, the controller 110 may store a second write pointer W_PTR2 directing the second data entity DQ_ET2 to the second area 114.

In an embodiment, when the external address ADDRe of the second data entity DQ_ET2 is identical to the external address ADDRe of the first data entity DQ_ET1, the controller 110 may replace the first data entity DQ_ET1 with the second data entity DQ_ET2. Also, the controller 110 may replace the first write pointer W_PTR1 with the second write pointer W_PTR2.

Figure 7:
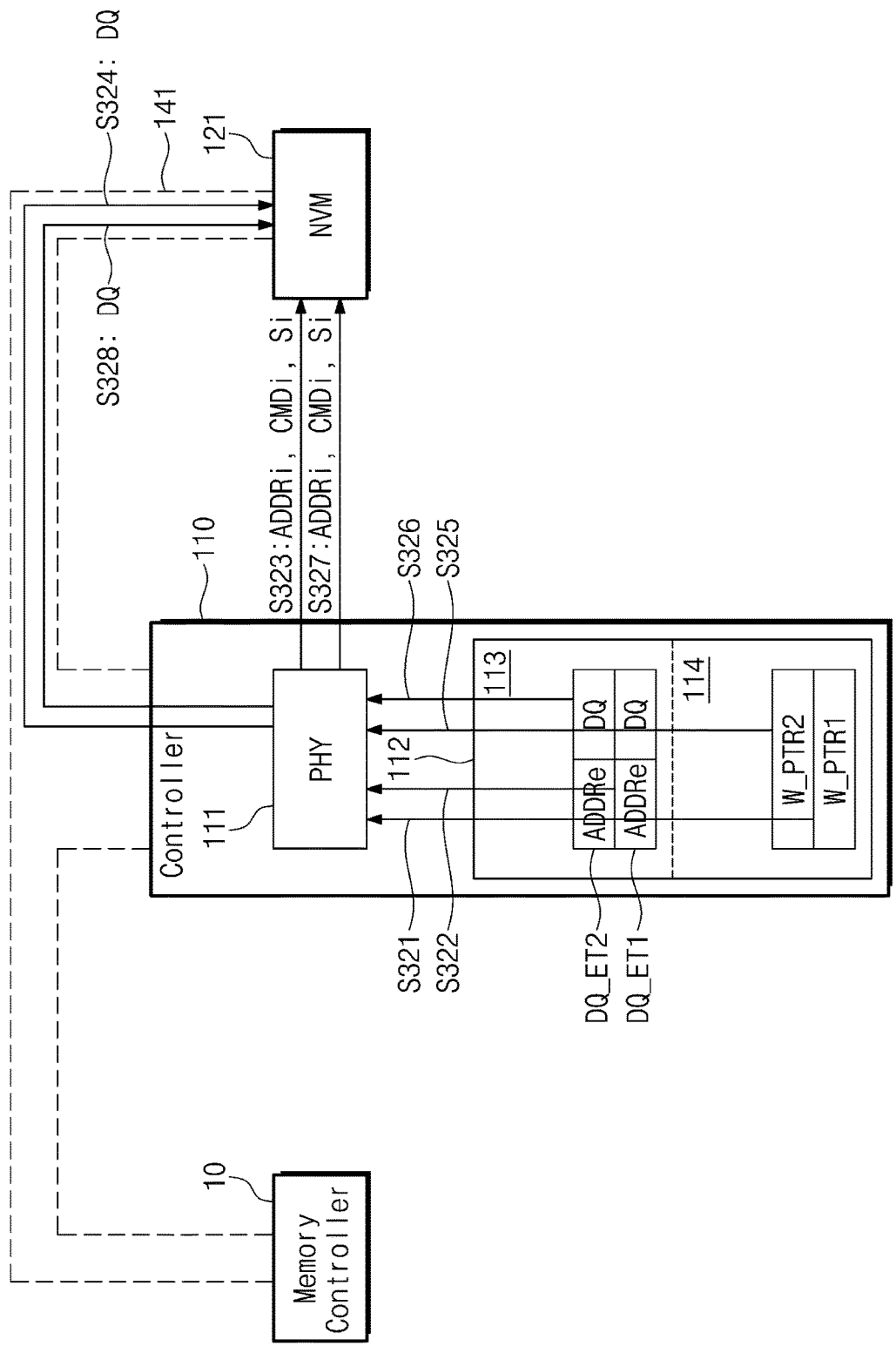
FIG. 7 is a diagram illustrating an example in which a controller writes data stored in a buffer to a first nonvolatile memory device when a flush condition is satisfied, following FIG. 6.

FIG. 7 is a diagram illustrating an example in which the controller 110 writes data stored in the buffer 112 to the first nonvolatile memory device 121 when a flush condition is satisfied, following FIG. 6. Referring to FIG. 7, in operation S321, the controller 110 reads the first write pointer W_PTR1, which is the oldest, from among write pointers stored in the second area 114 of the buffer 112.

In operation S322, the controller 110 reads the first data entity DQ_ET1 depending on the first write pointer W_PTR1 thus read. The controller 110 may generate the internal address ADDRi from the external address ADDRe of the first data entity DQ_ET1. The controller 110 may generate the internal command CMDi (e.g., a write command) from the first write pointer W_PTR1.

In operation S323, the controller 110 transmits the internal address ADDRi and the internal command CMDi to the first nonvolatile memory device 121 through the first data line 141 by using the physical block 111 and may adjust the internal selection signal Si like the second section of FIG. 3. In operation S324, the controller 110 transmits the data signals DQ to the first nonvolatile memory device 121 through the first data line 141 by using the physical block 111.

Likewise, in operation S325, the controller 110 reads the second write pointer W_PTR2 from the second area 114; in operation S326, the controller 110 reads the second data entity DQ_ET2 from the first area 113. In operation S327, the controller 110 transmits the internal address ADDRi and the internal command CMDi to the first nonvolatile memory device 121 through the first data line 141 by using the physical block 111, may control the internal selection signal Si like the second section of FIG. 3, and transmits the data signals DQ in operation S328.

The first nonvolatile memory device 121 may write the data signals DQ of the first data entity DQ_ET1 depending on operation S323, and may write the data signals DQ of the second data entity DQ_ET2 depending on operation S327.

In an embodiment, the controller 110 may remove the corresponding write pointer of the second area 114 after writing the data signals DQ of a particular data entity to the first nonvolatile memory device 121. The controller 110 may write the data signals DQ of a particular data entity to the first nonvolatile memory device 121 and then may maintain the particular data entity in the first area 113 or may remove the particular data entity from the first area 113.

Figure 8:
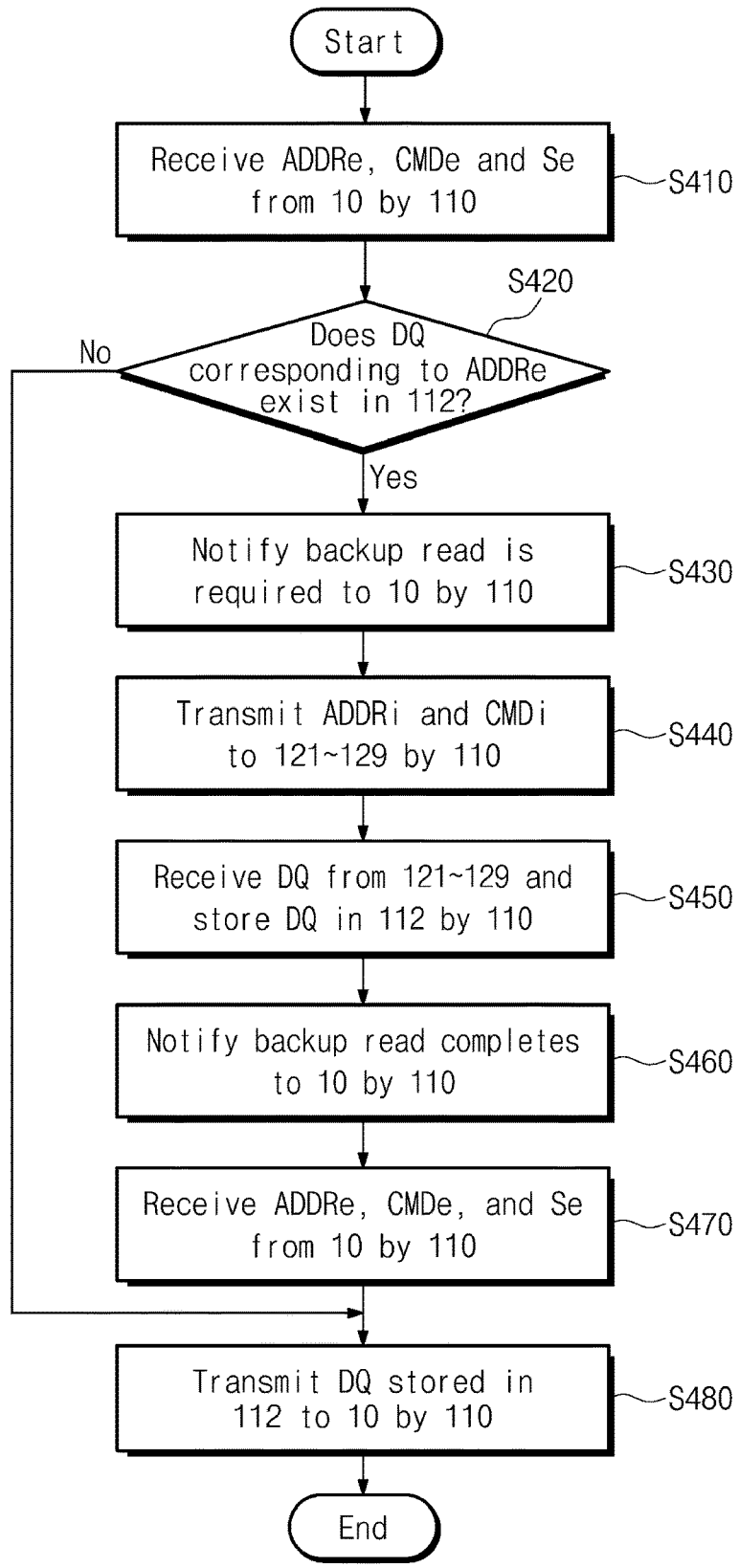
FIG. 8 is a flowchart illustrating an example in which a memory controller reads data from a semiconductor memory module.

FIG. 8 is a flowchart illustrating an example in which the memory controller 10 reads data from the semiconductor memory module 100. Referring to FIGS. 1 and 8, in operation S410, the controller 110 receives the external address ADDRe, the external command CMDe (e.g., a read command), and the activated external selection signal Se from the memory controller 10.

In operation S420, the controller 110 determines whether the data signals DQ corresponding to the external address ADDRe are present in the buffer 112. In the case where the data signals DQ corresponding to the external address ADDRe are present in the buffer 112, in operation S480, the controller 110 transmits the data signals DQ stored in the buffer 112 to the memory controller 10. Afterwards, the read process may be terminated.

In the case where the data signals DQ corresponding to the external address ADDRe are absent from the buffer 112, operation S430 is performed. In operation S430, the controller 110 may notify the memory controller 10 that a backup read operation is required. For example, the controller 110 may notify the memory controller 10 that a backup read operation is required, by activating an error signal, deactivating a ready signal, or outputting dummy data signals having an error.

The backup read operation may indicate a read operation of reading data requested by the memory controller 10 from the first to ninth nonvolatile memory devices 121 to 129 and storing the read data to the buffer 112 of the controller 110.

In operation S440, the controller 110 transmits the internal address ADDRi corresponding to the external address ADDRe, the internal command CMDi (e.g., a read command), and the activated internal selection signal Si to the first to ninth nonvolatile memory devices 121 to 129.

In operation S450, the controller 110 receives the data signals DQ corresponding to the internal address ADDRi from the first to ninth nonvolatile memory devices 121 to 129 and may store the received data signals DQ to the buffer 112.

In operation S460, the controller 110 notifies the memory controller 10 that the backup read operation is completed. For example, the controller 110 may notify the memory controller 10 that the backup read operation is completed, by deactivating an error signal, activating a ready signal, or stopping outputting dummy data signals having an error.

In operation S470, the controller 110 receives the external address ADDRe, the external command CMDe, and the activated external selection signal Se from the memory controller 10. Operation S470 may correspond to a retry of operation S410. Accordingly, the information received in operation S470 may be identical to the information received in operation S410. In operation S480, the controller 110 may transmit the data signals DQ stored in the buffer 112 to the memory controller 10. Afterwards, the read process may be terminated.

In an embodiment, in response to the notification of operation S430, the memory controller 10 may repeat operation S470 (or operation S410) of requesting a read operation from the controller 110 periodically. The controller 110 may provide notification that data are not yet prepared, by repeating operation S430. In this case, operation S460 may be omitted. When the controller 110 does not perform the notification of operation S430, the memory controller 10 may successfully read data from the semiconductor memory module 100 through operation S480.

As described above, the controller 110 may notify the memory controller 10 that the backup read operation is required, for the purpose of preventing the communication between the memory controller 10 and the controller 110 from colliding with the communication between the controller 110 and the first to ninth nonvolatile memory devices 121 to 129.

Figure 9:
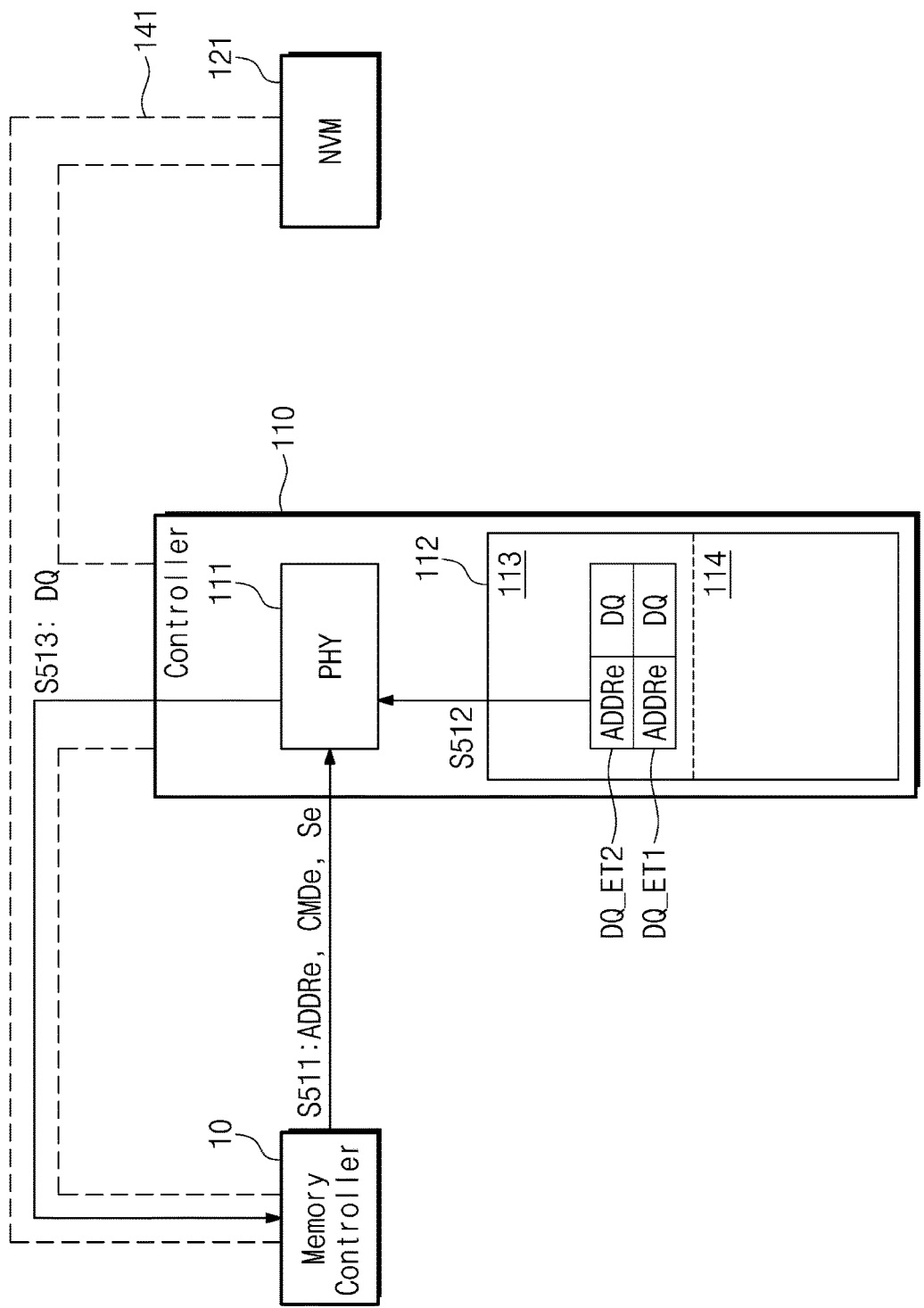
FIG. 9 is a diagram illustrating an example in which a memory controller reads data signals stored in a buffer, following FIG. 7.

FIG. 9 is a diagram illustrating an example in which the memory controller 10 reads data signals DQ stored in the buffer 112, following FIG. 7. Referring to FIG. 9, in operation S511, the memory controller 10 transmits the external address ADDRe and the external command CMDe (e.g., a read command) to the controller 110 and may control the external selection signal Se like the first section of FIG. 3.

In response to the external command CMDe, the controller 110 determines whether a data entity corresponding to the external address ADDRi is present in the first area 113 of the buffer 112. For example, the external address ADDRe received from the memory controller 10 may coincide with the external address ADDRe of the second data entity DQ_ET2.

In operation S512, the controller 110 reads the data signals DQ of the second data entity DQ_ET2 stored in the first area 113. In operation S513, the controller 110 transmits the data signals DQ read from the first area 113 to the memory controller 10 through the first data line 141.

Figure 10:
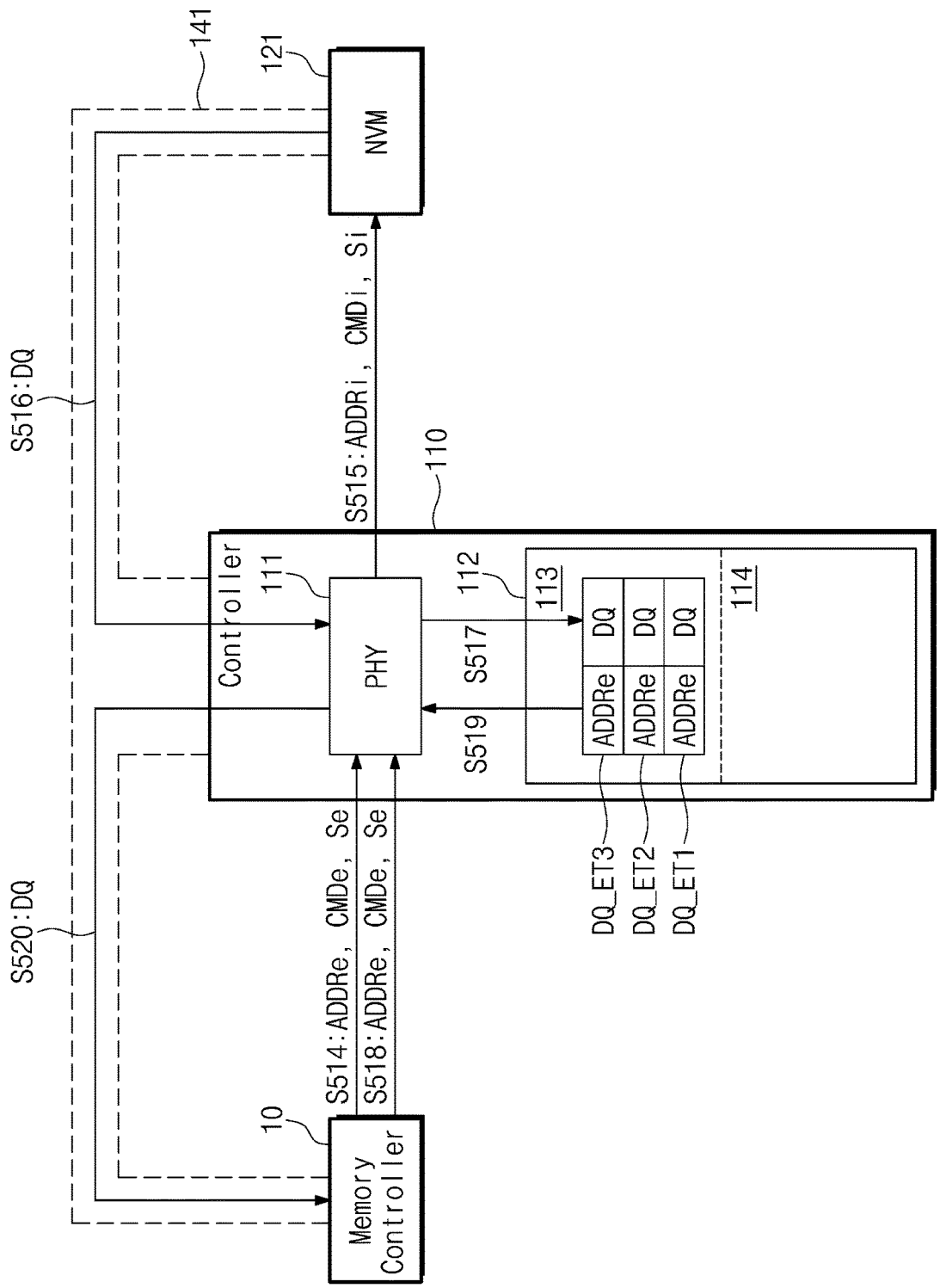
FIG. 10 is a diagram illustrating an example in which a memory controller reads data signals not stored in a buffer, following FIG. 9.

FIG. 10 is a diagram illustrating an example in which the memory controller 10 reads data signals DQ not stored in the buffer 112, following FIG. 9. Referring to FIG. 10, in operation S514, the memory controller 10 may transmit the external address ADDRe and the external command CMDe (e.g., a read command) to the controller 110 and may control the external selection signal Se like the first section of FIG. 3.

The controller 110 may determine that a data entity corresponding to the external address ADDRe received from the memory controller 10 is not stored in the buffer 112. The controller 110 may notify the memory controller 10 that the backup read operation is required.

In operation S515, the controller 110 transmits, to the first nonvolatile memory device 121, the internal address ADDRi, the internal command CMDi (e.g., a read command), and the internal selection signal Si adjusted as illustrated in the second section of FIG. 3. The first nonvolatile memory device 121 may read data depending on the internal address ADDRi, the internal command CMDi, and the activated internal selection signal Si.

In operation S516, the first nonvolatile memory device 121 transmits the read data to the controller 110 through the first data line 141 as the data signals DQ. In operation S517, the controller 110 stores the external address ADDRe received from the memory controller 10 and the data signals DQ received from the first nonvolatile memory device 121 as a third data entity DQ_ET3 to the first area 113 of the buffer 112.

As the third data entity DQ_ET3 is stored to the first area 113, the controller 110 may notify the memory controller 10 that the backup read operation is completed. As the backup read operation is completed, in operation S518, the memory controller 10 transmits the external address ADDRe and the external command CMDe to the controller 110 and may control the external selection signal Se like the first section of FIG. 3.

In operation S519, the controller 110 reads the data signals DQ of the third data entity DQ_ET3 of the first area 113. In operation S520, the controller 110 transmits the data signals DQ read from the first area 113 to the memory controller 10 through the first data line 141.

Figure 11:
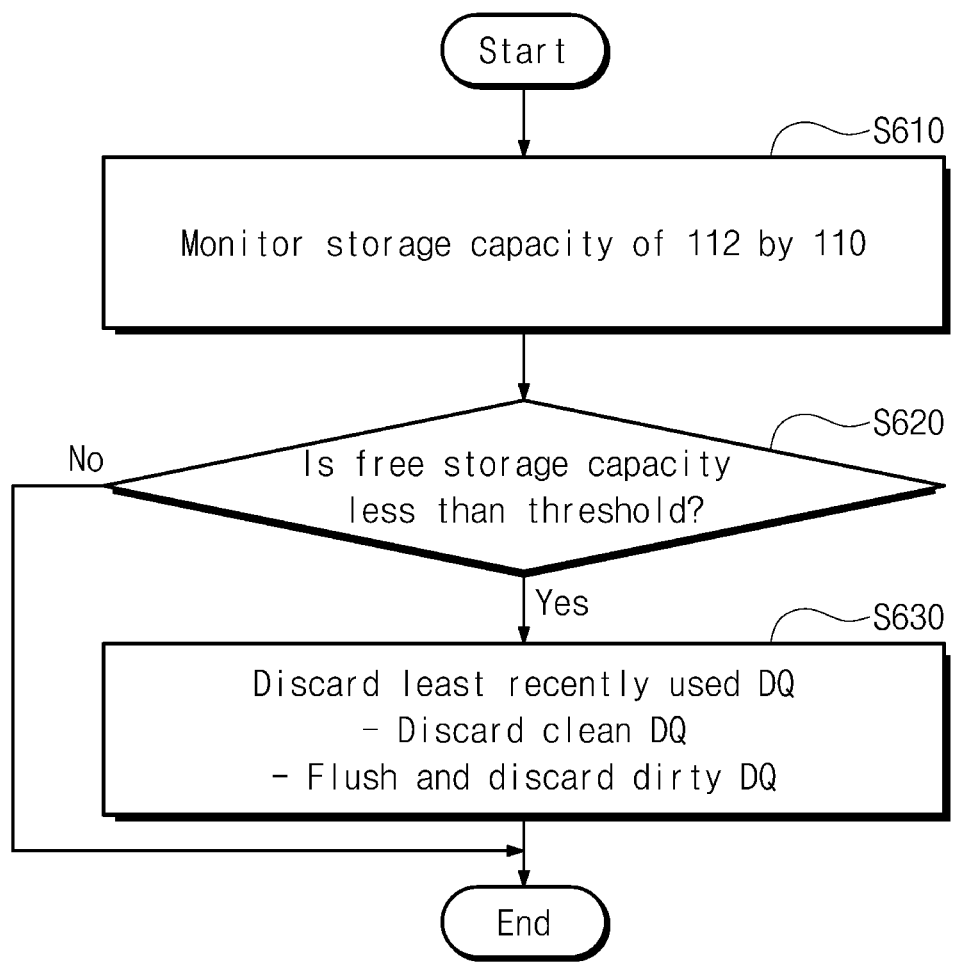
FIG. 11 is a flowchart illustrating an example in which a controller manages a buffer.

FIG. 11 is a flowchart illustrating an example of a method in which the controller 110 manages the buffer 112. Referring to FIGS. 1 and 11, in operation S610, the controller 110 monitors a storage capacity of the buffer 112.

In operation S620, depending on a result of the monitoring, the controller 110 determines whether a free storage capacity of the buffer 112 is less than a threshold. In the case where the free storage capacity of the buffer 112 is not less than the threshold, the process is terminated. In the case where the free storage capacity of the buffer 112 is less than the threshold, operation S630 is performed.

In operation S630, the controller 110 may discard least recently used (LRU) data signals DQ among the data signals DQ stored in the buffer 112. For example, the controller 110 may discard clean data signals DQ which do not need to be written to the first to ninth nonvolatile memory devices 121 to 129.

For another example, the controller 110 may write dirty data signals DQ, which should be written to the first to ninth nonvolatile memory devices 121 to 129, to the first to ninth nonvolatile memory devices 121 to 129 (refer to FIG. 7), and may discard the corresponding data signals DQ.

For example, the controller 110 may be configured to discard the oldest used data signals DQ first of all or to discard clean data signals DQ first of all. The priority of data which the controller 110 may discard may be set by the memory controller 10.

Figure 12:
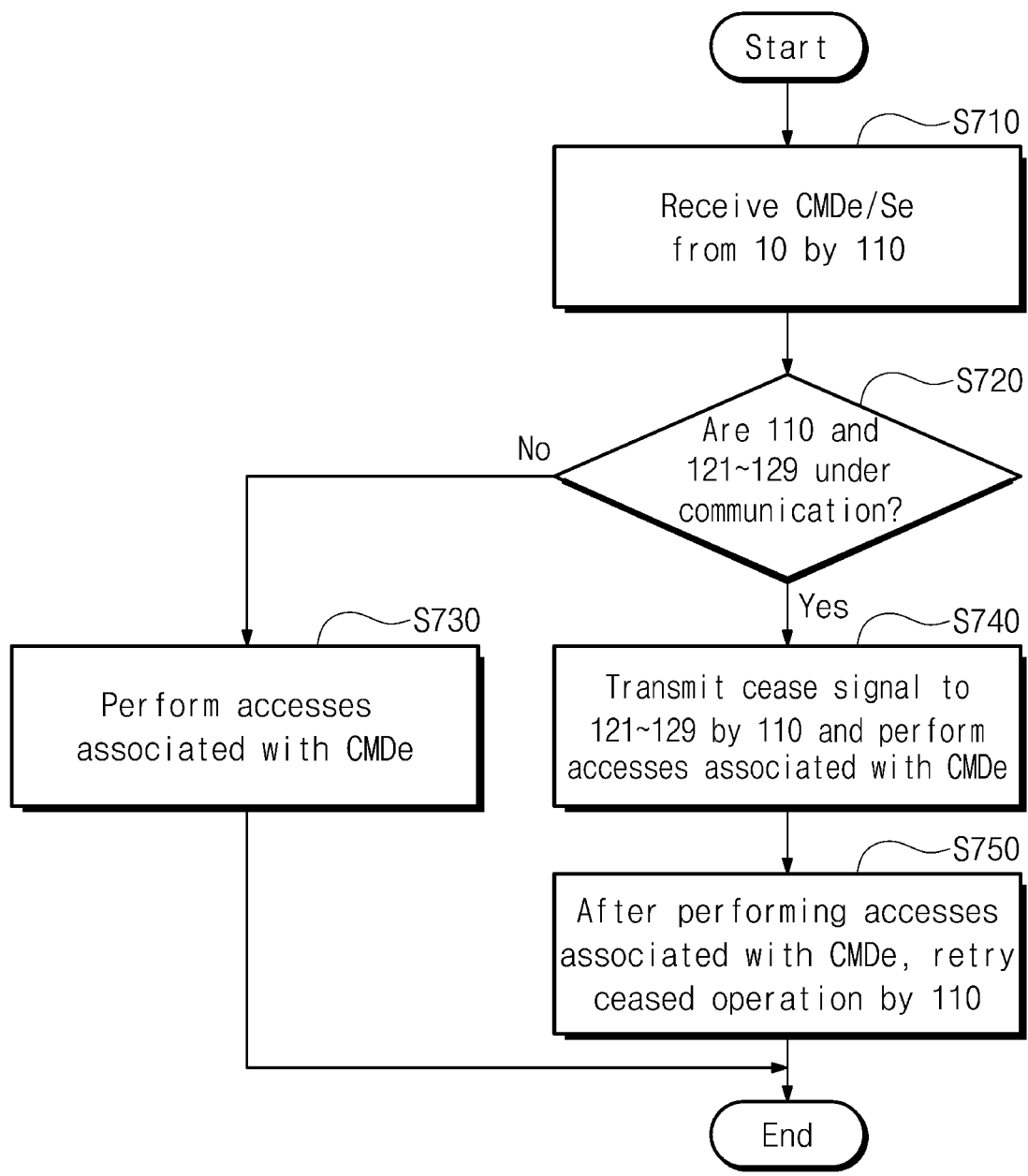
FIG. 12 is a flowchart illustrating an example in which a controller arbitrates communication through first to ninth data lines.

FIG. 12 is a flowchart illustrating an example in which the controller 110 arbitrates communication through the first to ninth data lines 141 to 149. Referring to FIGS. 1 and 12, in operation S710, the controller 110 receives the external command CMDe or the external selection signal Se from the memory controller 10. For example, an arbitration method according to an embodiment of the inventive concept may be triggered by the external command CMDe or the external selection signal Se.

In operation S720, the controller 110 determines whether the communication with the first to ninth nonvolatile memory devices 121 to 129 is being performed (e.g., will be performed). When the controller 110 does not communicate with the first to ninth nonvolatile memory devices 121 to 129, the controller 110 may perform accesses (refer to FIG. 5, 6, 9, 10, or 13) associated with the external command CMDe. Afterwards, the process is terminated.

If the controller 110 is communicating with the first to ninth nonvolatile memory devices 121 to 129, in operation S740, the controller 110 may transmit (e.g., activate) a cease signal to the first to ninth nonvolatile memory devices 121 to 129. Depending on the cease signal, the first to ninth nonvolatile memory devices 121 to 129 may cease exchanging the internal data signals DQi with the first to ninth data lines 141 to 149. The controller 110 may then perform accesses associated with the external command CMDe.

In operation S750, after performing the accesses associated with the external command CMDe, the controller 110 may retry an operation ceased by the cease signal. For example, the controller 110 may request the first to ninth nonvolatile memory devices 121 to 129 to resume the ceased operation. For another example, the controller 110 may request to again start the ceased operation from the beginning, through the internal address ADDRi, the internal command CMDi, and the internal selection signal Si.

Figure 13:
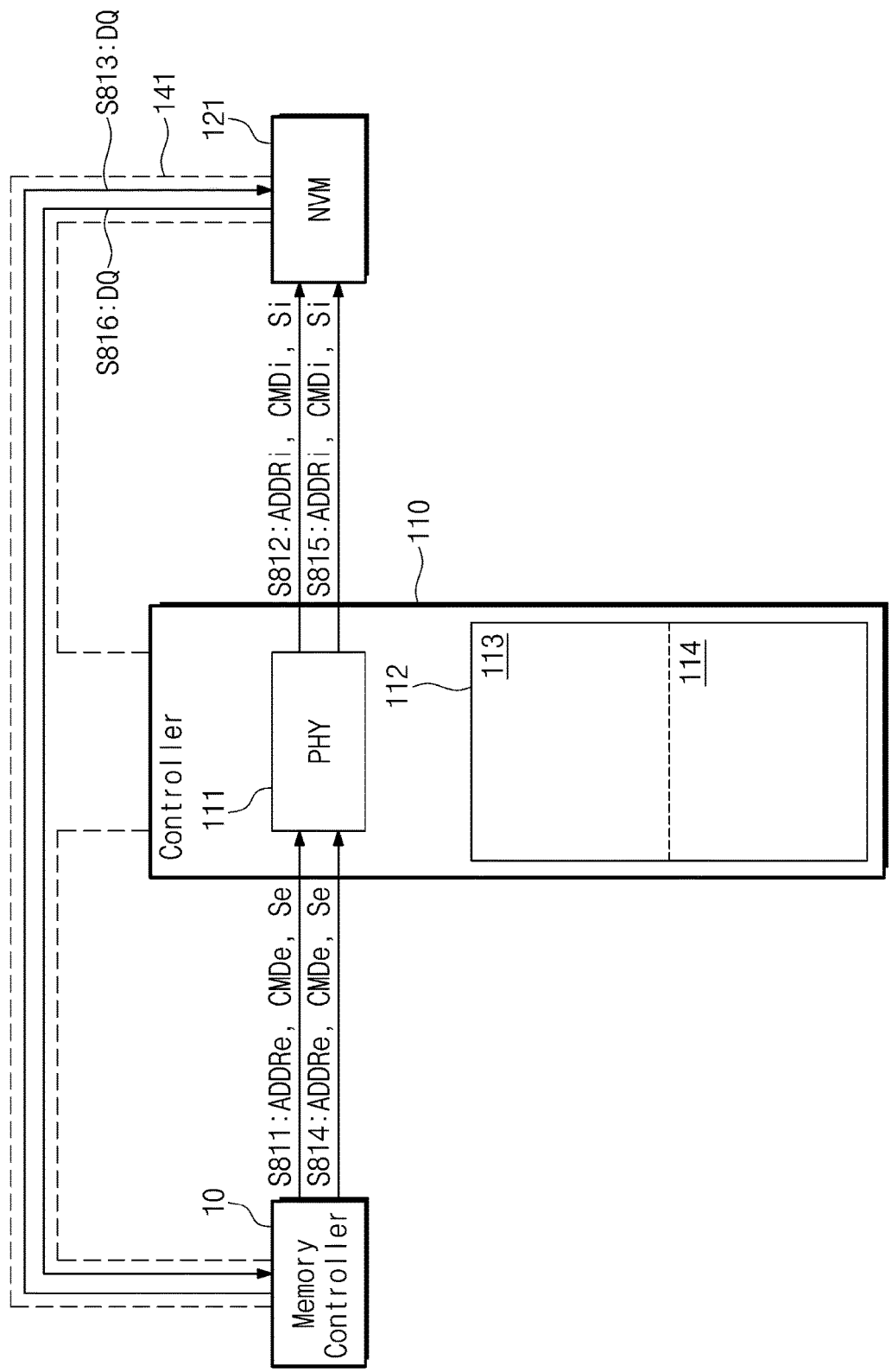
FIG. 13 is a diagram illustrating an example in which a memory controller directly accesses a first nonvolatile memory device through a first data line.

FIG. 13 is a diagram illustrating an example in which the memory controller 10 directly accesses the first nonvolatile memory device 121 through the first data line 141. Referring to FIG. 13, in operation S811, the memory controller 10 transmits the external address ADDRe and the external command CMDe (e.g., a write command) to the controller 110 and may control the external selection signal Se like the third section of FIG. 3.

The physical block 111 of the controller 110 may generate the internal address ADDRi and the internal command CMDi from the external address ADDRe and the external command CMDe. In operation S812, the controller 110 transmits, to the first nonvolatile memory device 121, the internal address ADDRi, the internal command CMDi, and the internal selection signal Si adjusted as illustrated in the third section of FIG. 3. In operation S813, the memory controller 10 transmits the data signals DQ directly to the first nonvolatile memory device 121 through the first data line 141 (e.g., without the data passing through the controller 110). For example, the data signals DQ may pass through data buffer 131 without being stored to the controller.

In operation S814, the memory controller 10 transmits the external address ADDRe and the external command CMDe (e.g., a read command) to the controller 110 and may control the external selection signal Se like the third section of FIG.

3. The physical block 111 of the controller 110 may generate the internal address ADDRi and the internal command CMDi from the external address ADDRe and the external command CMDe.

In operation S815, the controller 110 transmits, to the first nonvolatile memory device 121, the internal address ADDRi, the internal command CMDi, and the internal selection signal Si adjusted as illustrated in the third section of FIG. 3. In operation S816, the memory controller 10 receives the data signals DQ directly from the first nonvolatile memory device 121 through the first data line 141 (e.g., without the data passing through the controller 110.

Figure 14:
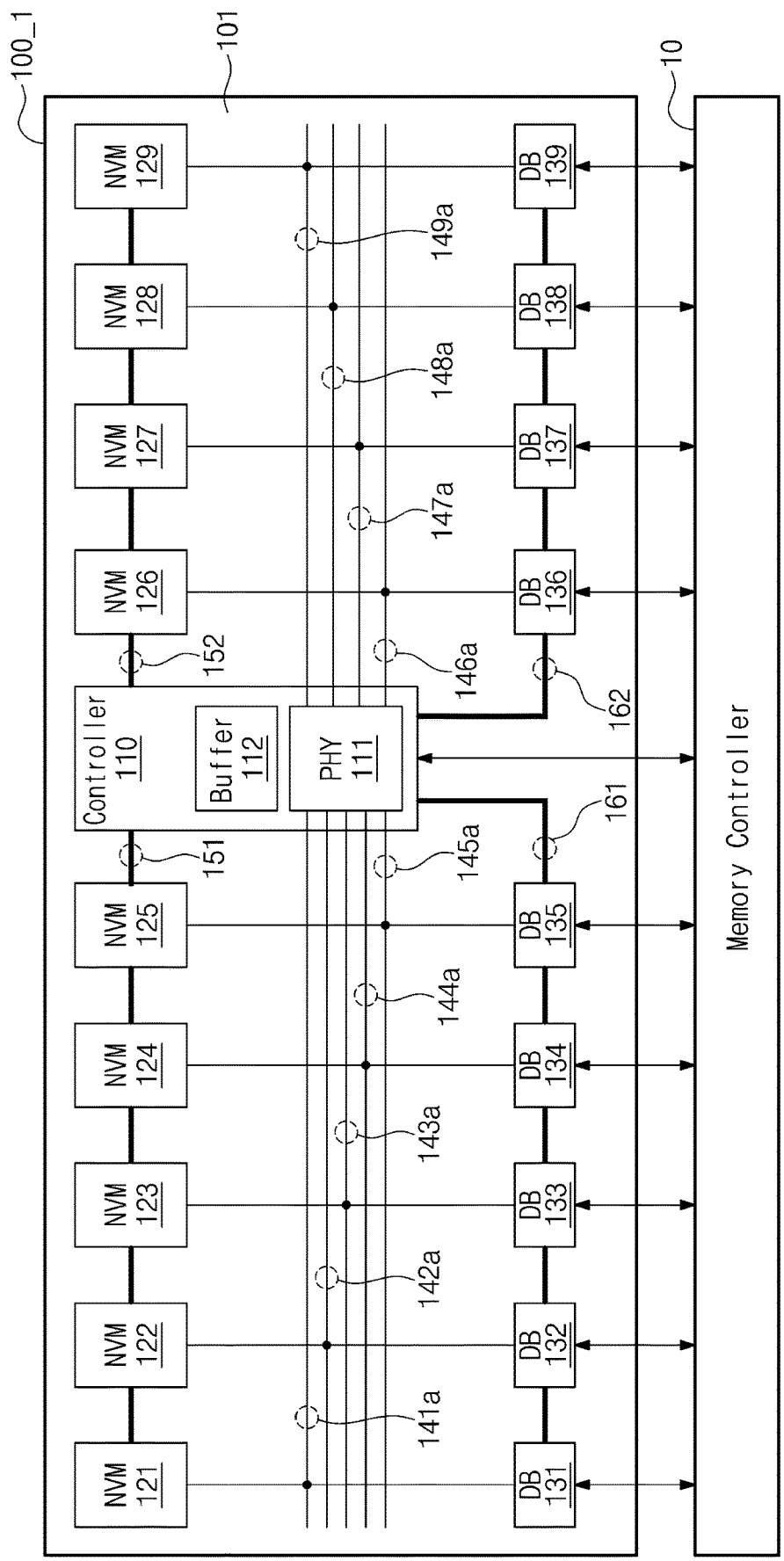
FIG. 14 is a block diagram illustrating a semiconductor memory module according to a second embodiment of the inventive concept.

FIG. 14 is a block diagram illustrating a semiconductor memory module 100_1 according to a second embodiment of the inventive concept. Components of the semiconductor memory module 100_1 are identical to the components of the semiconductor memory module 100 of FIG. 1 except for first to ninth data lines 141*a* to 149*a*. Thus, additional description will be omitted to avoid redundancy.

Referring to FIG. 14, the first to ninth data lines 141*a* to 149*a* may include first lines extended from opposite sides of the controller 110, second lines connecting the first lines and the first to ninth nonvolatile memory devices 121 to 129, and third lines connecting the first lines and the first to ninth data buffers 131 to 139. The second lines and the third lines may be implemented to be identical to the lines described with reference to FIG. 1. The first lines may have the same length regardless of locations of first nodes connected with the second lines or locations of second nodes connected with the third lines.

Loads of the first to ninth data lines 141*a* to 149*a* seen from the controller 110 may become uniform. The loads of the first to ninth data lines 141*a* to 149*a* seen from the first to ninth nonvolatile memory devices 121 to 129 may become uniform. Also, the loads of the first to ninth data lines 141*a* to 149*a* seen from the first to ninth data buffers 131 to 139 may become uniform. Accordingly, transmission timings of the internal data signals DQi may be uniform. As a result, a skew may be prevented.

Figure 15:
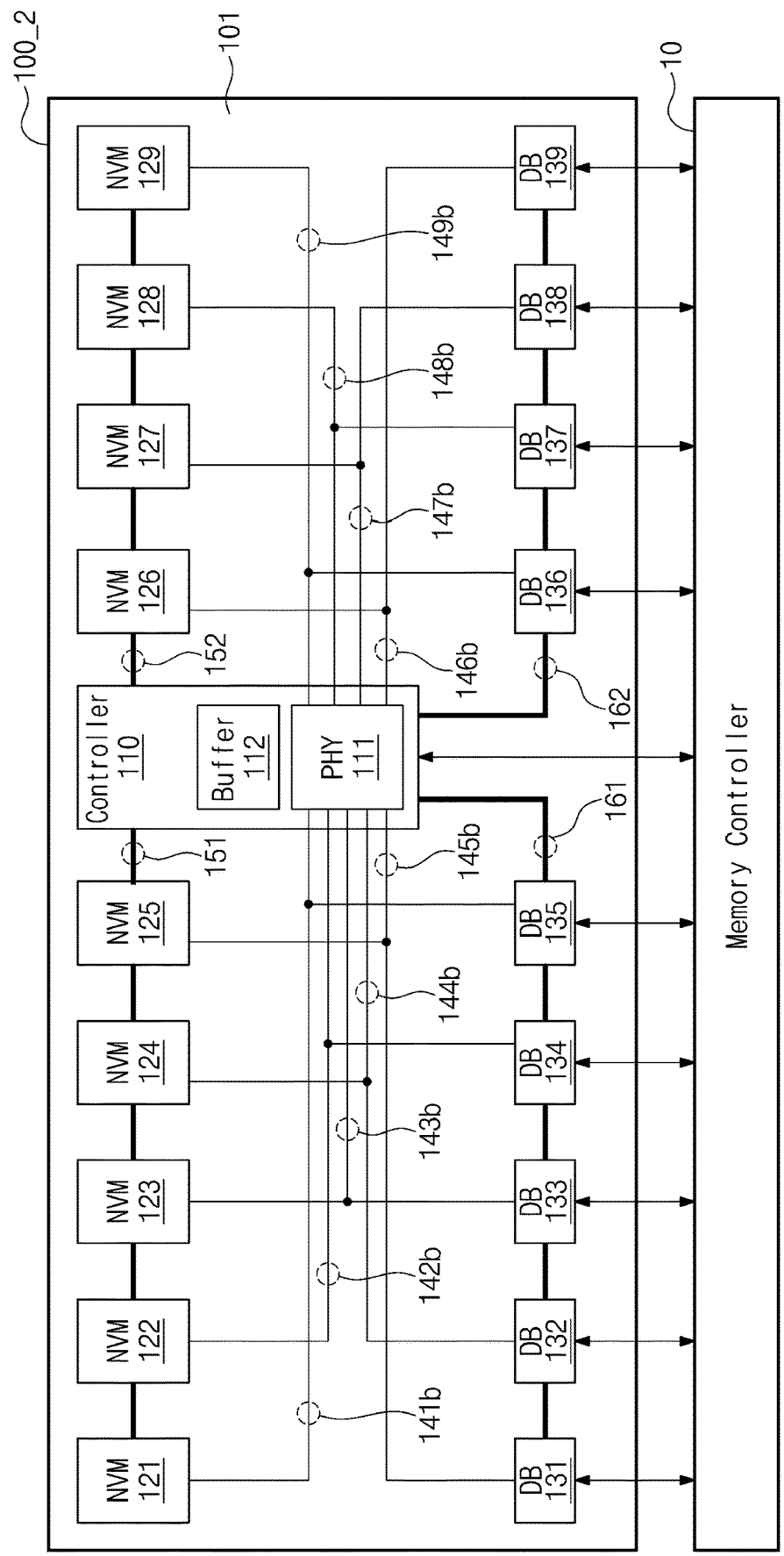
FIG. 15 is a block diagram illustrating a semiconductor memory module according to a third embodiment of the inventive concept.

FIG. 15 is a block diagram illustrating a semiconductor memory module 100_2 according to a third embodiment of the inventive concept. Components of the semiconductor memory module 100_2 are identical to the components of the semiconductor memory module 100 of FIG. 1 except for first to ninth data lines 141*b* to 149*b*. Thus, additional description will be omitted to avoid redundancy.

Referring to FIG. 15, the first lines of the first to ninth data lines 141*b* to 149*b* may have different lengths. Locations of the first nodes and the second nodes may be adjusted to make loads of the first to ninth data lines 141*b* to 149*b* more similar. For example, the data line 141*b* or 149*b* may be formed by connecting a second line of a nonvolatile memory device 121 or 129 which is the furthermost from the controller 110 and a third line of a data buffer 135 or 136 which is the closest to the controller 110, with one of the first lines.

The data line 142*b* or 148*b* may be formed by connecting a second line of a nonvolatile memory device 122 or 128 which is second far from the controller 110 and a third line of a data buffer 134 or 137 which is second close to the controller 110, with another of the first lines.

The data line 145*b* or 146*b* may be formed by connecting a second line of a nonvolatile memory device 125 or 126 which is the closest to the controller 110 and a third line of a data buffer 131 or 139 which is the furthermost from the controller 110, with another of the first lines.

Figure 16:
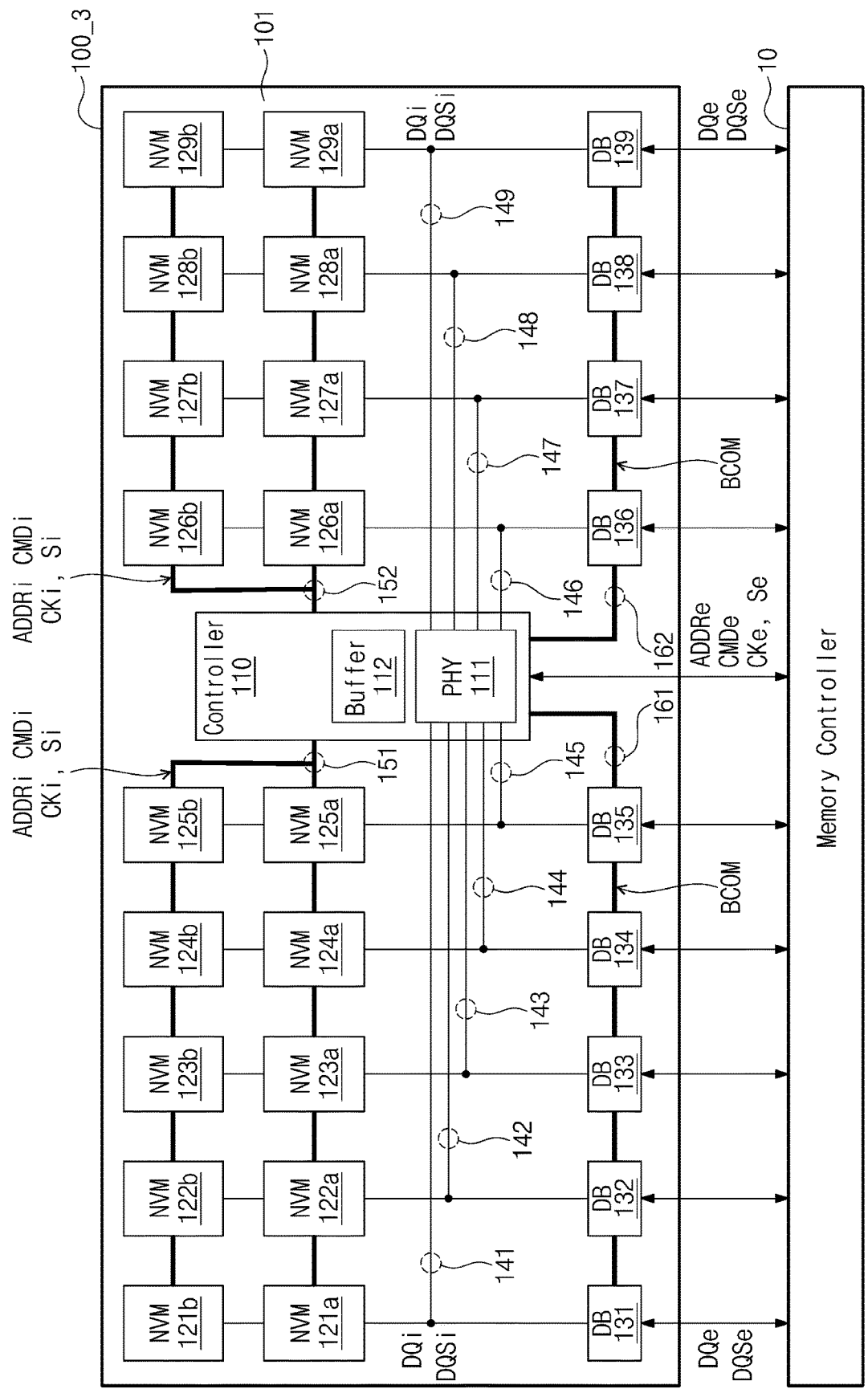
FIG. 16 is a block diagram illustrating a semiconductor memory device according to a fourth embodiment of the inventive concept.

FIG. 16 is a block diagram illustrating a semiconductor memory module 100_3 according to a fourth embodiment of the inventive concept. Compared with the semiconductor memory module 100 of FIG. 1, the semiconductor memory module 100_3 includes a first rank of first to ninth nonvolatile memory devices 121*a* to 129*a* and a second rank of first to ninth nonvolatile memory devices 121*b* to 129*b*. Note that though the data lines 141-149 are shown, the varied data line structures of FIG. 14 or FIG. 15 could be used instead.

The controller 110 may transmit the internal address ADDRi, the internal command CMDi, and the internal selection signal Si in common to the first to ninth nonvolatile memory devices 121*a* to 129*a* in the first rank and the first to ninth nonvolatile memory devices 121*b* to 129*b* in the second rank through the first control lines 151 and 152.

The first nonvolatile memory devices 121*a* and 121*b* may be connected in common to the first data line 141. The second ninth nonvolatile memory devices 122*a* and 122*b* may be connected in common to the second data line 142. Likewise, a particular nonvolatile memory device in the first rank may be connected in common to one data line together with the corresponding nonvolatile memory device in the second rank.

Figure 17:
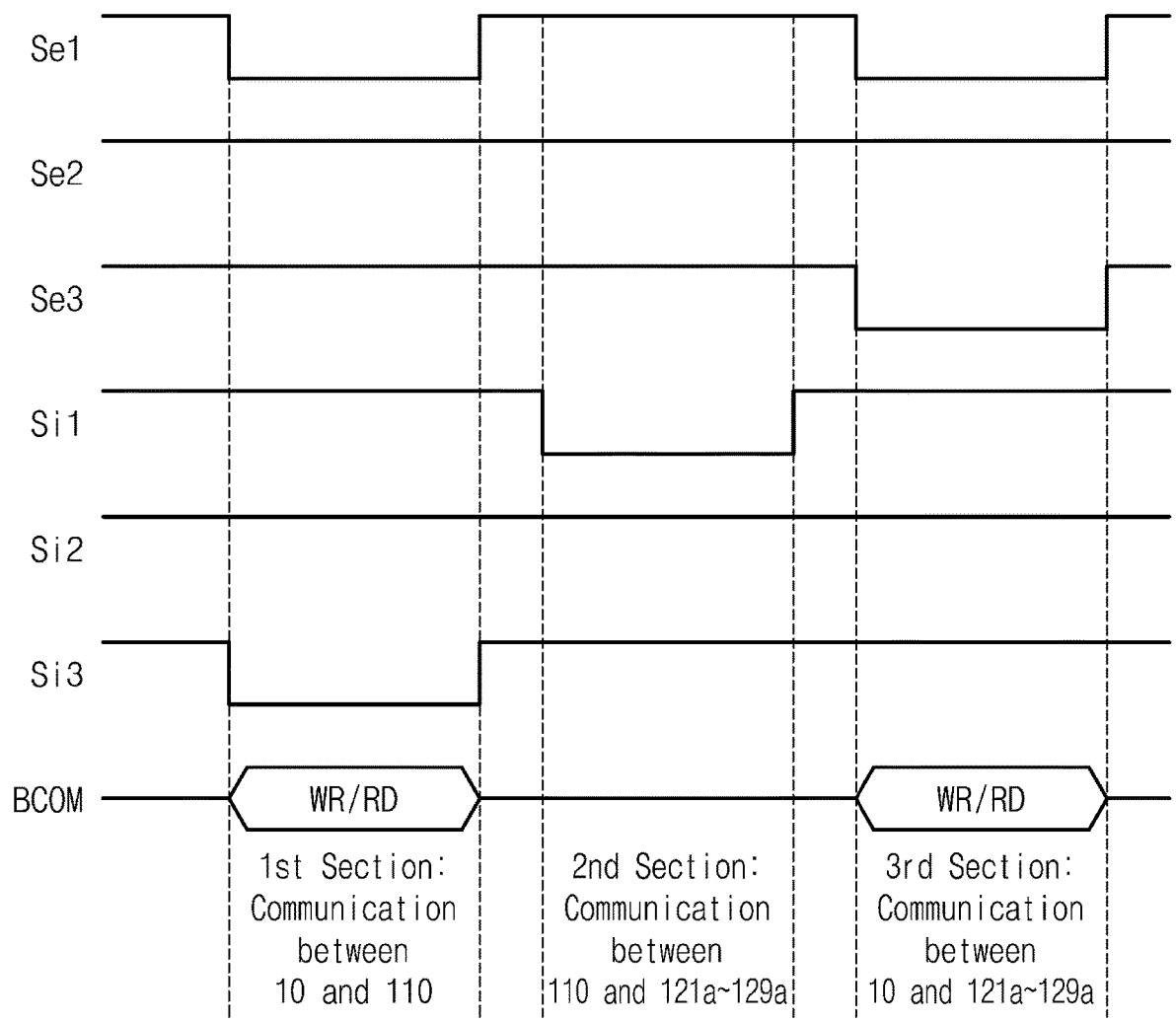
FIGS. 17 and 18 are diagrams illustrating examples in which an external selection signal and an internal selection signal are adjusted.
Figure 18:
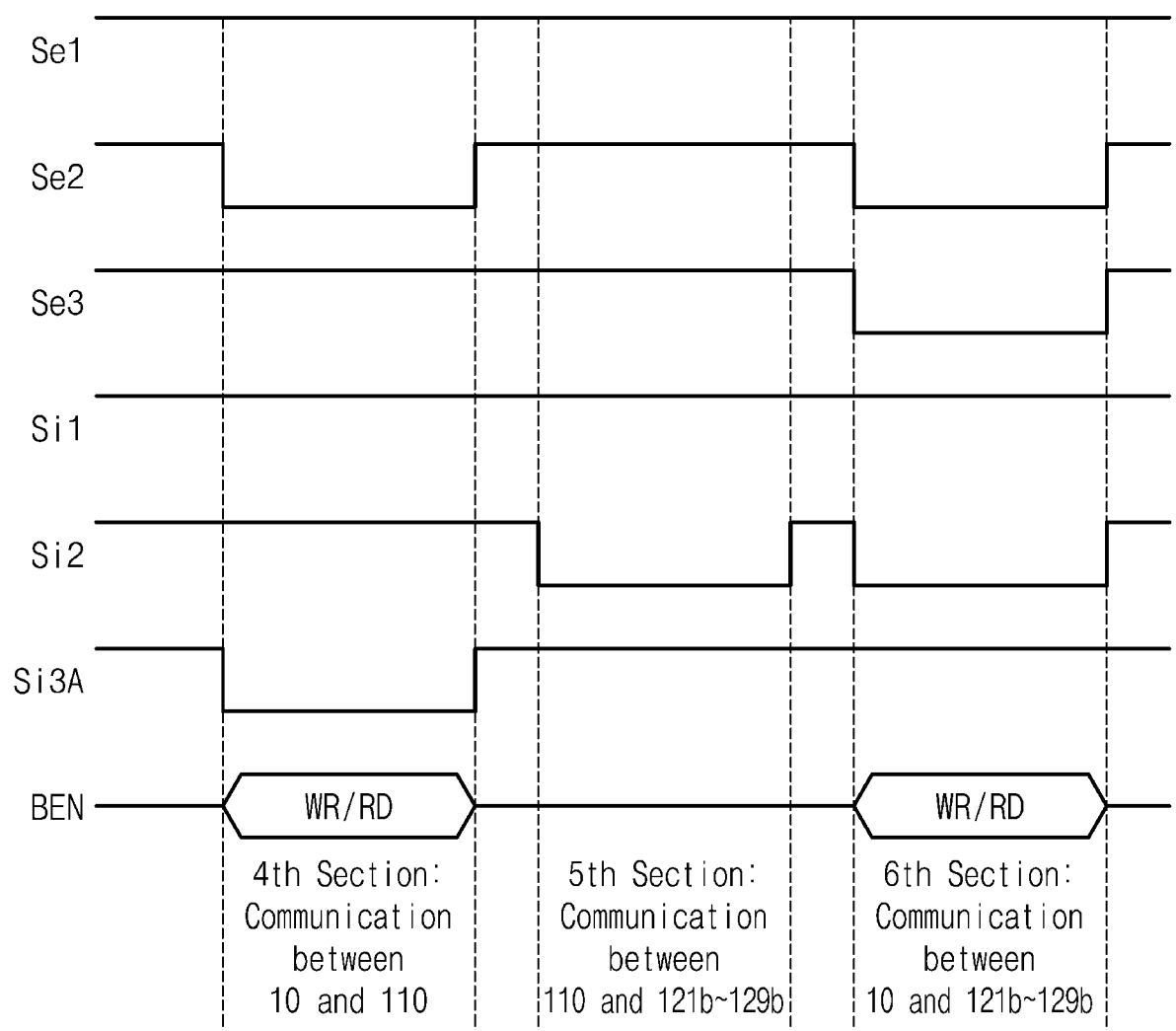

FIGS. 17 and 18 are diagrams illustrating examples in which the external selection signal Se and the internal selection signal Si are adjusted. Referring to FIGS. 16 to 18, the external selection signal Se may include a first external selection signal Se1 to a third external selection signal Se3. The first external selection signal Se1 may be activated (to a low level) by the memory controller 10 in order to cause or set the memory controller 10 to access the first to ninth nonvolatile memory devices 121*a* to 129*a* in the first rank through the controller 110.

The second external selection signal Se2 may be activated (to a low level) by the memory controller 10 in order to cause or set the memory controller 10 to access the first to ninth nonvolatile memory devices 121*b* to 129*b* in the second rank through the controller 110. The third external selection signal Se3 may be activated (to a low level) by the memory controller 10 in order to cause or set the memory controller 10 to access the first to ninth nonvolatile memory devices 121*a* to 129*a* in the first rank or the first to ninth nonvolatile memory devices 121*b* to 129*b* in the second rank without passing through the controller 110 (e.g., by bypassing the controller 110).

The internal selection signal Si may include the first to third internal selection signals Si1 to Si3. The first internal selection signal Si1 may be activated (to a low level) by the controller 110 in order to cause or set the controller 110 to access the first to ninth nonvolatile memory devices 121*a* to 129*a* in the first rank.

The second internal selection signal Si2 may be activated (to a low level) by the controller 110 in order to cause or set the controller 110 to access the first to ninth nonvolatile memory devices 121*b* to 129*b* in the second rank. The third internal selection signal Si3 may be activated by the controller 110 in order to cause or set the controller 110 to inhibit the communication of the first to ninth nonvolatile memory devices 121*a* to 129*a* in the first rank and the communication of the first to ninth nonvolatile memory devices 121*b* to 129*b* in the second rank.

In a first section, the memory controller 10 and the controller 110 may communicate with each other through the first to ninth data buffers 131 to 139 and the first to ninth data lines 141 to 149. In the first section, the memory controller 10 may provide notification that the first to ninth nonvolatile memory devices 121*a* to 129*a* in the first rank are targeted for an access, by activating the first external selection signal Se1. Information about the activation of the first external selection signal Se1 may be stored to the buffer 112.

The controller 110 may transmit a write command WR or a read command RD as the buffer command BCOM. The controller 110 may inhibit the communication of the nonvolatile memory devices 121a to 129a and 121b to 129b, by activating the third internal selection signal Si3.

In a second section, the controller 110 and the first to ninth nonvolatile memory devices 121a to 129a in the first rank may communicate with each other through the first to ninth data lines 141 to 149. Depending on the activation information of the first external selection signal Se1 stored in the buffer 112, the controller 110 may activate the first internal selection signal Si1 to communicate with the first to ninth nonvolatile memory devices 121a to 129a in the first rank.

In a third section, the memory controller 10 and the first to ninth nonvolatile memory devices 121a to 129a in the first rank may communicate with each other through the first to ninth data buffers 131 to 139 and the first to ninth data lines 141 to 149.

The memory controller 10 may activate the first external selection signal Se1 and the third external selection signal Se3 to provide notification that the memory controller 10 directly accesses the first to ninth nonvolatile memory devices 121a to 129a in the first rank. The controller 110 may transmit a write command WR or a read command RD as the buffer command BCOM.

In a fourth section, the memory controller 10 and the controller 110 may communicate with each other through the first to ninth data buffers 131 to 139 and the first to ninth data lines 141 to 149. In the fourth section, the memory controller 10 may activate the second external selection signal Se2 to provide notification that the first to ninth nonvolatile memory devices 121b to 129b in the second rank are targeted for an access. Information about the activation of the second external selection signal Se2 may be stored to the buffer 112.

The controller 110 may transmit a write command WR or a read command RD as the buffer command BCOM. The controller 110 may inhibit the communication of the nonvolatile memory devices 121a to 129a and 121b to 129b, by activating the third internal selection signal Si3.

In a fifth section, the controller 110 and the first to ninth nonvolatile memory devices 121b to 129b in the second rank may communicate with each other through the first to ninth data lines 141 to 149. Depending on the activation information of the second external selection signal Se2 stored in the buffer 112, the controller 110 may activate the second internal selection signal Si2 to communicate with the first to ninth nonvolatile memory devices 121b to 129b in the second rank.

In a sixth section, the memory controller 10 and the first to ninth nonvolatile memory devices 121b to 129b in the second rank may communicate with each other through the first to ninth data buffers 131 to 139 and the first to ninth data lines 141 to 149.

The memory controller 10 may activate the second external selection signal Se2 and the third external selection signal Se3 to provide notification that the first to ninth nonvolatile memory devices 121b to 129b in the second rank are targeted for a direct access. The controller 110 may transmit a write command WR or a read command RD as the buffer command BCOM.

Figure 19:
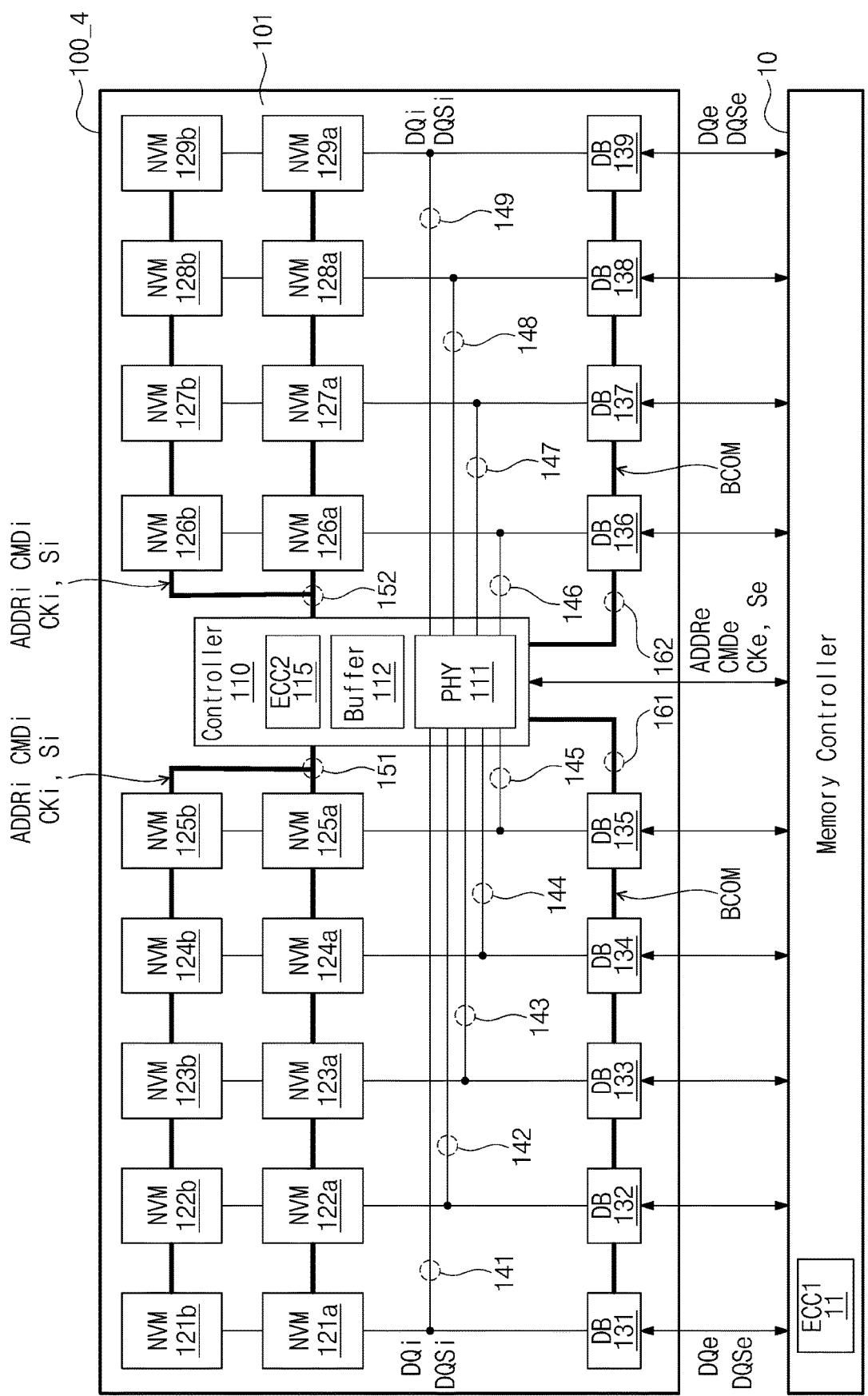
FIG. 19 is a block diagram illustrating a semiconductor memory module according to a fifth embodiment of the inventive concept.

FIG. 19 is a block diagram illustrating a semiconductor memory module 100_4 according to a fifth embodiment of the inventive concept. Compared to the semiconductor memory module 100_3 of FIG. 16, the memory controller 10 includes a first error correction block 11 in which a first error correction code ECC1 is included. The controller 110 may include a second error correction block 115 in which a second error correction code ECC2 is included. Note that though the data lines 141-149 are shown, the varied data line structures of FIG. 14 or FIG. 15 could be used instead.

To prevent collision between the first error correction block 11 of the memory controller 10 and the second error correction block 115 of the controller 110, the memory controller 10 may be configured to pass through the buffer 112 of the controller 110 upon accessing the first to ninth nonvolatile memory devices 121a to 129a in the first rank and to bypass the buffer 112 of the controller 110 upon accessing the first to ninth nonvolatile memory devices 121b to 129b in the second rank.

For example, when the memory controller 10 writes data to the first to ninth nonvolatile memory devices 121a to 129a in the first rank, the first error correction block 11 may generate first error correction parity (e.g., may perform error correction encoding), and the second error correction block 115 may generate second error correction parity (e.g., may perform error correction encoding). The first error correction parity and the second error correction parity may be written to the first to ninth nonvolatile memory devices 121a to 129a together with data.

When the memory controller 10 reads data from the first to ninth nonvolatile memory devices 121a to 129a, the second error correction block 115 may correct an error by using the second error correction parity (e.g., may perform error correction decoding), and the first error correction block 11 may correct an error by using the first error correction parity (e.g., may perform error correction decoding).

When the memory controller 10 writes data to the first to ninth nonvolatile memory devices 121b to 129b in the second rank, the first error correction block 11 may generate the first error correction parity. The first error correction parity may be written to the first to ninth nonvolatile memory devices 121b to 129b together with data.

When the memory controller 10 reads data from the first to ninth nonvolatile memory devices 121b to 129b, the first error correction block 11 may correct an error by using the first error correction parity.

According to various aspects of the inventive concept, nonvolatile memory devices, data buffers, and a controller communicate with each other through common data lines. Accordingly, a semiconductor memory module which has reduced costs and reduced noise while coinciding with standards of a main memory is provided.

While the inventive concept has been described with reference to exemplary embodiments thereof, it will be apparent to those of ordinary skill in the art that various changes and modifications may be made thereto without departing from the spirit and scope of the invention as set forth in the following claims.

What is claimed is:

1. A semiconductor memory module comprising:
    data buffers configured to exchange first data signals with an external device outside of the semiconductor memory module;
    nonvolatile memory devices respectively directly connected to the data buffers through data lines; and
    an internal memory module controller connected to the data lines,
    wherein the internal memory module controller is further configured to:

receive an address, a command, and a control signal from the external device; and depending on the address, the command, and the control signal, control the data buffers through first control lines and control the nonvolatile memory devices through second control lines.

2. The semiconductor memory module of claim 1, wherein, depending on the command and the control signal, the internal memory module controller selects between one of a first state of receiving second data signals from the data lines, a second state of transmitting third data signals to the data lines, and a third state of ignoring fourth data signals transmitted through the data lines.

3. The semiconductor memory module of claim 1, wherein, under control of the internal memory module controller, the data buffers have a first state of receiving second data signals from the data lines, a second state of transmitting third data signals to the data lines, and a third state of ignoring fourth data signals transmitted through the data lines.

4. The semiconductor memory module of claim 1, wherein, under control of the internal memory module controller, the nonvolatile memory devices have a first state of receiving second data signals from the data lines, a second state of transmitting third data signals to the data lines, and a third state of ignoring fourth data signals transmitted through the data lines.

5. The semiconductor memory module of claim 1, wherein, in the case where the address, the command, or the control signal is received from the external device when the internal memory module controller is set to communicate with the nonvolatile memory devices through the data lines, the internal memory module controller ceases or cancels communication with the nonvolatile memory devices.

6. The semiconductor memory module of claim 1, wherein the internal memory module controller includes an interface circuit connected with the data lines, and wherein the internal memory module controller is further configured to use the interface circuit in common for communicating with the data buffers and for communicating with the nonvolatile memory devices.

7. The semiconductor memory module of claim 1, wherein the internal memory module controller includes a buffer memory, and wherein the internal memory module controller is further configured to:

store second data signals received through the data lines from the data buffers or the nonvolatile memory devices to the buffer memory; and transmit the second data signals stored in the buffer memory to the nonvolatile memory devices or the data buffers through the data lines as third data signals.

8. The semiconductor memory module of claim 7, wherein the second data signals to be transmitted to the nonvolatile memory devices from the data buffers through the data lines and the third data signals to be transmitted to the data buffers from the nonvolatile memory devices through the data lines, depending on the command and the control signal, bypass the buffer memory of the internal memory module controller.

9. The semiconductor memory module of claim 7, wherein the internal memory module controller is further configured to discard fourth data signals previously stored in the buffer memory when a free storage capacity of the buffer memory is less than a threshold.

10. The semiconductor memory module of claim 1, wherein the control signal includes a first control signal, and wherein, the internal memory module controller is further configured such that when the first control signal is in an activated state, the internal memory module controller controls the nonvolatile memory devices such that the nonvolatile memory devices ignore second data signals transmitted through the data lines and the internal memory module controller receives or transmits the second data signals through the data lines.

11. The semiconductor memory module of claim 10, wherein the control signal further includes a second control signal, and wherein the internal memory module controller is further configured such that when the first control signal is in an activated state and the second control signal is in a activated state, the internal memory module controller controls the nonvolatile memory devices such that the nonvolatile memory devices exchange fourth data signals with the data lines and the internal memory module controller ignores the fourth data signals transmitted through the data lines.

12. The semiconductor memory module of claim 10, wherein the internal memory module controller is further configured to deactivate the data buffers and to exchange fourth data signals with the nonvolatile memory devices through the data lines, when the first control signal is in a deactivated state.

13. The semiconductor memory module of claim 1, wherein the control signal includes a first control signal and a second control signal, and wherein the internal memory module controller is further configured to, when one of the first control signal and the second control signal is in an activated state, receive second data signals from the data buffers through the data lines or transmit third data signals to the data buffers through the data lines.

14. The semiconductor memory module of claim 13, wherein the control signal further includes a third control signal, and wherein, the internal memory module controller is further configured to, based on the first control signal being in an activated state and the third control signal being in an activated state, control first nonvolatile memory devices of the nonvolatile memory devices such that the first nonvolatile memory devices exchange fourth data signals with the data lines, control second nonvolatile memory devices of the nonvolatile memory devices such that the second nonvolatile memory devices ignore the fourth data signals transmitted through the data lines, and ignore the fourth data signals transmitted through the data lines.

15. The semiconductor memory module of claim 13, wherein the internal memory module controller is further configured to, based on the first control signal and the second control signal being in deactivated states, deactivate the data buffers and to exchange fourth data signals with the first nonvolatile memory devices or the second nonvolatile memory devices through the data lines.

16. A semiconductor memory module comprising:

data buffers configured to exchange data signals with an external device outside of the semiconductor memory module;

first nonvolatile memory devices respectively connected to the data buffers through data lines;

second nonvolatile memory devices respectively connected to the data buffers through the data lines; and a controller connected to the data lines, wherein the controller is configured to receive an address, a command, and a control signal from the external device, and wherein the first nonvolatile memory devices are configured to communicate with the data buffers through the data lines and the controller and the second nonvolatile memory devices are configured to directly communicate with the data buffers through the data lines, depending on the address, the command, and the control signal.

17. The semiconductor memory module of claim 16, wherein the controller includes an error correction block, and wherein the controller is further configured to:

perform error correction encoding on data to be written to the first nonvolatile memory devices through the data lines; and perform error correction decoding on data read from the first nonvolatile memory devices through the data lines.

18. A semiconductor memory module comprising:

data buffers configured to exchange data signals with an external device outside of the semiconductor memory module;

nonvolatile memory devices respectively connected with the data buffers through data lines; and a controller connected to the data lines, wherein the data lines include:

first lines extending from one side of the controller;

second lines extending from the first lines toward the data buffers; and third lines extending from the first lines toward the nonvolatile memory devices, wherein the controller is further configured to:

receive an address, a command, and a control signal from the external device; and control the data buffers through first control lines and control the nonvolatile memory devices through second control lines depending on the address, the command, and the control signal.

19. The semiconductor memory module of claim 18, wherein the first lines have the same length as each other, regardless of locations of first nodes at which the first lines are connected to the second lines or locations of second nodes at which the first lines are connected to the third lines.

20. The semiconductor memory module of claim 18, wherein one line of the first lines is connected to a first nonvolatile memory device, which is the furthest from the controller from among the nonvolatile memory devices, and to a first data buffer, which is the closest to the controller, from among the data buffers, and wherein another line of the first lines is connected to a second nonvolatile memory device, which is the closest to the controller from among the nonvolatile memory devices, and to a second data buffer, which is the furthest from the controller, from among the data buffers.

* * * * *